United States Patent
Gilbert et al.

[11] Patent Number: 6,041,313
[45] Date of Patent: Mar. 21, 2000

[54] 401K USER SOFTWARE

[75] Inventors: James A. Gilbert, 10600 Wilshire Blvd., #729, Los Angeles, Calif. 90024; Manish Gupta, Beverly Hills, Calif.

[73] Assignee: James A. Gilbert, Los Angeles, Calif.

[21] Appl. No.: 09/106,009

[22] Filed: Jun. 29, 1998

[51] Int. Cl.[7] .................................................. G06F 17/00
[52] U.S. Cl. ............................................................. 705/36
[58] Field of Search ................................................ 705/36

[56] References Cited

U.S. PATENT DOCUMENTS

| | | | |
|---|---|---|---|
| 4,648,037 | 3/1987 | Valentino | 364/408 |
| 4,750,121 | 6/1988 | Halley et al. | 364/408 |
| 4,933,842 | 6/1990 | Durbin et al. | 364/408 |
| 4,953,085 | 8/1990 | Atkins | 364/408 |
| 4,969,094 | 11/1990 | Halley et al. | 364/408 |
| 4,994,964 | 2/1991 | Wolfberg et al. | 364/408 |
| 5,095,429 | 3/1992 | Harris et al. | 364/408 |
| 5,132,899 | 7/1992 | Fox | 364/408 |
| 5,214,579 | 5/1993 | Wolfberg et al. | 364/408 |
| 5,227,967 | 7/1993 | Bailey | 364/408 |

*Primary Examiner*—Emanuel Todd Voeltz
*Assistant Examiner*—Phillip Groutt
*Attorney, Agent, or Firm*—Lacasse & Associates; Randy W. Lacasse

[57] ABSTRACT

A computer-based 401(k) plan offers unlimited access to virtually all SEC-regulated investment options—with no restrictions on the number of mutual fund families or their investments that a company can choose for its plan. The system and method provide an end-user computer-based system with individualized accountability as opposed to prior art pooled systems.

31 Claims, 43 Drawing Sheets

FIG. 12

| | |
|---|---|
| XYZ Company | Employer: XYZ Company |
| | Contact: Mr. Kai Palffy |
| | Tax ID: 12-3456789 |
| | Address: 12345 Somewhere Ave. |
| | Los Angeles CA 90046 |
| | Phone: (818) 123-4567  Fax: (818) 765-4321 |
| | Courier: |
| | Employer Matching ☑  Last Period: MAY 1998 |
| | Enh. Statements ☐  Processed: 5/28/98 |
| | Express Delivery ☐ |
| | Notes: |

FIG. 13

XYZ Company

| Employees | Details |
|---|---|
| Anderson, Paul | Name: Paul Anderson |
| Askar, Ron I | Division: |
| Aung, Ye H | Soc Sec: 888-88-8888 |
| Bakhtiyari, Zahra | VIP: |
| Balfoort, Gregory | Address: |
| Barkat, Tasnim | |
| Becker, Jack R | |
| Beever, Jennifer | Phone: |
| Bell, Noel E | DOB:  Joined: |
| Brown, Melanie | Hired:  Termin: |
| Bui, Hal N | Contrib: |
| Bui, Van Khanh | Notes: |
| Burr-Knittle, Ruth | |
| Burres, Keith E | |
| Caldwell, Jennifer D | ☐ Officer  ☐ HC Relative  ☐ 5% Owner |
| Colello, Patricia S | ☑ Eligible  ☐ Participant  ☐ 1% Owner |
| Crew, Teresa F | ☑ No App |
| Dang, Kevin | |
| Davis, Hai P | Est. Salary: $75,331.70  Vested: ??? |
| Deckard, Phillip E | Emp. ID: 21692 |
| DiBari, Samuel A | |

| XYZ Company | | Jack R Becker |
|---|---|---|
| Allocations Updated On | 03/29/95 | |

| Portfolio | % | Account # |
|---|---|---|
| Hancock Money Market Fund B | 50% | 0050973725814 |
| Hancock Govt Income B | 50% | 0430973725841 |
| | 100% | |

FIG. 14

XYZ Company
Becker, Jack R

| Start Date | 07/15/95 |
|---|---|
| Principal Amount | $27,000.00 |
| Interest Rate (APR) | 5.00% |
| Periods (Months) | 120 |
| Primary Residence | ✓ |
| Amortized Monthly Payment | $286.38 |
| Desired Monthly Payment | $286.38 |
| Total Amortized Value | $34,365.23 |
| Total Payments | $7,445.88 |
| Balance Due | $26,919.35 |

Clear  Exit

FIG. 15

| Evergreen Media Corp. | | | | Bennett Zier |
|---|---|---|---|---|
| Date | Period | Type | Portfolio | Amount |
| 07/11/97 | 1997.06 | Rollover | Evergreen Money Market A | 15,000.00 |
| 07/11/97 | 1997.06 | Rollover | MFS High-Income B | 1,586.36 |
| 07/11/97 | 1997.06 | Rollover | MFS Large Cap Growth B | 3,172.73 |
| 07/11/97 | 1997.06 | Rollover | MFS Emerging Growth B | 3,172.73 |
| 07/11/97 | 1997.06 | Rollover | MFS Research B | 4,759.12 |
| 07/11/97 | 1997.06 | Rollover | MFS World Equity B | 3,172.73 |
| 11/07/97 | 1997.07 | Loan Distribution | Evergreen Money Market A | (15,139.33) |

[ New ] [ Edit ] [ Delete ] [ MF Apps ] [ Exit ]

FIG. 16

EMPLOYEE CONTRIBUTION HISTORY

Printed On: 6/4/98

■ Noel Bell
87 Lopez Rd
Cedar Grove, NJ 07009

| Post Date | Portfolio | Account # | Amount | Type |
|---|---|---|---|---|
| 12/31/94 | Historical Transfer | N/A | 16,328.25 | Employee Contribution |
| 12/31/94 | Historical Transfer | N/A | 0.00 | Employer Contribution |
| 01/31/95 | MFS Emerging Growth B | 20781 905 | 144.42 | Employee Contribution |
| 01/31/95 | MFS Total Return B | 21581 908 | 192.56 | Employee Contribution |
| 01/31/95 | Transamerica Growth & Inc B | 01760 874 | 144.43 | Employee Contribution |
| 02/28/95 | MFS Emerging Growth B | 20781 905 | 138.63 | Employee Contribution |
| 02/28/95 | MFS Total Return B | 21581 908 | 184.84 | Employee Contribution |
| 02/28/95 | Transamerica Growth & Inc B | 01760 874 | 138.64 | Employee Contribution |
| 03/31/95 | MFS Emerging Growth B | 20781 905 | 136.32 | Employee Contribution |
| 03/31/95 | MFS Total Return B | 21581 908 | 181.75 | Employee Contribution |
| 03/31/95 | Transamerica Growth & Inc B | 01760 874 | 136.31 | Employee Contribution |
| 04/30/95 | MFS Emerging Growth B | 20781 905 | 137.62 | Employee Contribution |
| 04/30/95 | MFS Total Return B | 21581 908 | 183.49 | Employee Contribution |
| 04/30/95 | Transamerica Growth & Inc B | 01760 874 | 137.62 | Employee Contribution |
| 05/31/95 | MFS Emerging Growth B | 20781 905 | 126.81 | Employee Contribution |
| 05/31/95 | MFS Total Return B | 21581 908 | 169.07 | Employee Contribution |
| 05/31/95 | Transamerica Growth & Inc B | 01760 874 | 126.80 | Employee Contribution |
| 06/30/95 | MFS Emerging Growth B | 20781 905 | 118.67 | Employee Contribution |
| 06/30/95 | MFS Total Return B | 21581 908 | 158.24 | Employee Contribution |
| 06/30/95 | Transamerica Growth & Inc B | 01760 874 | 118.68 | Employee Contribution |
| 07/31/95 | Hancock Freedom Regnl Bank B | | 140.71 | Employee Contribution |
| 07/31/95 | Hancock Special Equities B | | 187.61 | Employee Contribution |
| 07/31/95 | MFS Emerging Growth B | 20781 905 | 140.71 | Employee Contribution |
| 08/31/95 | Hancock Freedom Regnl Bank B | 776 | 219.71 | Employee Contribution |
| 08/31/95 | Hancock Special Equities B | 775 | 292.94 | Employee Contribution |
| 08/31/95 | MFS Emerging Growth B | 20781 905 | 219.71 | Employee Contribution |
| 09/30/95 | Hancock Freedom Regnl Bank B | 776 | 145.34 | Employee Contribution |
| 09/30/95 | Hancock Special Equities B | 775 | 193.79 | Employee Contribution |
| 09/30/95 | MFS Emerging Growth B | 20781 905 | 145.35 | Employee Contribution |
| 10/31/95 | Hancock Freedom Regnl Bank B | 776 | 139.20 | Employee Contribution |
| 10/31/95 | Hancock Special Equities B | 775 | 185.60 | Employee Contribution |
| 10/31/95 | MFS Emerging Growth B | 20781 905 | 139.19 | Employee Contribution |

EMPLOYEE/EMPLOYER CONTRIBUTIONS -- DATA IN

■ XYZ Company

■ JUNE 1 through JUNE 30, 1998

| EMPLOYEE NAME | SOCIAL SECURITY NUMBER | VOLUNTARY EMPLOYEE CONTRIBUTION | EMPLOYER MATCHING CONTRIBUTION | W-2 COMPENSATION |
|---|---|---|---|---|
| Paul Anderson | 888-88-8888 | *** Non-Participant *** | | $_____ |
| Ron I Askar | 000-00-0000 | $_____ | $_____ | $_____ |
| Ye H Aung | 808-08-0808 | $_____ | $_____ | $_____ |
| Zahra Bakhtiyari | 999-99-9999 | *** Non-Participant *** | | $_____ |
| Gregory Balfoort | 999-99-9999 | *** Non-Participant *** | | $_____ |
| Tasnim Barkat | 474-74-7474 | *** Non-Participant *** | | $_____ |
| Noel E Bell | 666-66-6666 | $_____ | $_____ | $_____ |
| Hal N Bui | 444-44-4444 | *** Non-Participant *** | | $_____ |
| Van Khanh Bui | 777-77-7777 | $_____ | $_____ | $_____ |
| Ruth Burr-Knittle | 242-42-4242 | $_____ | $_____ | $_____ |
| Jennifer D Caldwell | 414-14-1414 | $_____ | $_____ | $_____ |
| Patricia S Colello | 000-00-0000 | *** Non-Participant *** | | $_____ |
| Teresa F Crew | 161-61-6161 | $_____ | $_____ | $_____ |
| Kevin Dang | 777-77-7777 | $_____ | $_____ | $_____ |
| Hai P Davis | 222-22-2222 | $_____ | $_____ | $_____ |
| Phillip E Deckard | 464-64-6464 | *** Non-Participant *** | | $_____ |
| Samuel A DiBari | 222-22-2222 | $_____ | $_____ | $_____ |
| Kevin T Dinh | 707-07-0707 | $_____ | $_____ | $_____ |
| Trieu V Dinh | 606-06-0606 | $_____ | $_____ | $_____ |
| Dominic E Fortino | 181-81-8181 | $_____ | $_____ | $_____ |
| Ajay V Garg | 222-22-2222 | *** Non-Participant *** | | $_____ |
| Julie L Gaukel | 141-41-4141 | $_____ | $_____ | $_____ |

FIG. 23

Evergreen Media Corp.

| Employee | Portfolio | Account # |
|---|---|---|
| Tools, Carlin L | Hancock Global Fund B | |
| Williamson, Angelina A | Hancock Global Fund B | |
| Deller, Edward J | Hancock Global Fund B | |
| Dugan, Edward J | Hancock International B | |
| Williamson, Angelina A | Hancock Pacific Basin Equities B | |
| Globe, Edward C | Hancock Regional Bank B | |
| Michel, Tom R | Hancock Regional Bank B | |
| Dugan, Edward J | Hancock Regional Bank B | |
| Tools, Carlin L | Hancock Sovereign Bond B | |
| Dugan, Edward J | Hancock Sovereign Bond B | |
| Spencer, Dawn A | Hancock Special Equities B | |
| Dugan, Edward J | Hancock Special Equities B | |
| Michel, Tom R | Hancock Special Equities B | |
| Adelman, Jessica A | Evergreen Quality Bond B | |
| Byrd, Marla L | Evergreen Diversified Bond B | |
| Ciambriello, Shaileen Rensh | Evergreen Balanced Fund B | |
| Smith, Hoyt A | Evergreen Blue Chip B | |
| Mack, Jr., Richard P | Evergreen Blue Chip B | |
| Tools, Carlin L | Evergreen Blue Chip B | |
| Meade, Vicki | MFS Large Cap Growth B | |
| Christian, Carole Galloway | MFS Large Cap Growth B | |
| Tedesco, Angel M | MFS Large Cap Growth B | |
| Ciambriello, Shaileen Rensh | MFS Large Cap Growth B | |
| Cooper, Joseph G | MFS Large Cap Growth B | |
| Dallman, Louis J | MFS Large Cap Growth B | |
| Price, Laura R | MFS Large Cap Growth B | |
| Tedesco, Angel M | MFS Emerging Growth B | |
| Price, Laura R | MFS Emerging Growth B | |
| Ciambriello, Shaileen Rensh | MFS Emerging Growth B | |
| Michel, Tom R | MFS Emerging Growth B | |
| Smith, Hoyt A | MFS Emerging Growth B | |
| Johnson, Fredricka L | MFS Emerging Growth B | |
| Meade, Vicki | MFS Emerging Growth B | |
| Deller, Edward J | MFS Government Ltd Maturity B | |
| Dallman, Louis J | MFS Research B | |
| Tedesco, Angel M | MFS Research B | |
| Smith, Hoyt A | MFS Research B | |
| Tools, Carlin L | MFS Research B | |
| Deller, Edward J | MFS Research B | |
| Cooper, Joseph G | MFS Research B | |
| Meade, Vicki | MFS Research B | |
| Spencer, Dawn A | MFS Capital Opportunities B | |
| Dallman, Louis J | MFS World Equity B | |
| Tedesco, Angel M | MFS World Equity B | |
| Christian, Carole Galloway | MFS World Equity B | |
| Deller, Edward J | MFS World Growth B | |
| Johnson, Kurt J | MFS World Growth B | |
| Smith, Hoyt A | MFS World Total Return B | |
| Spencer, Dawn A | Putnam Fund for Grth & Inc B | |
| Edmunds, Nancy Y | Putnam Global Growth B | |

FIG. 26

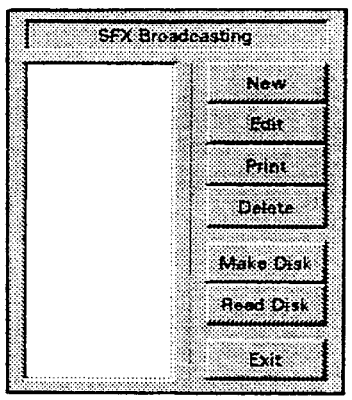
FIG. 27
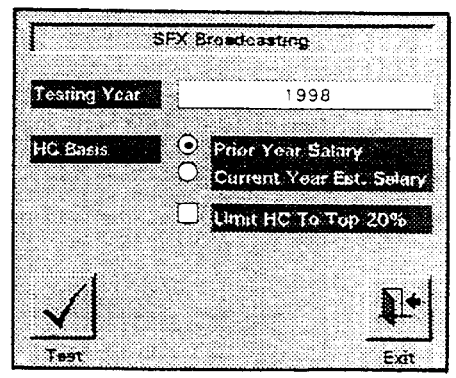
FIG. 28
FIG. 29
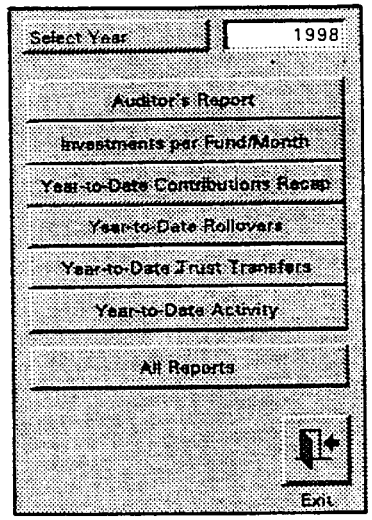
FIG. 30
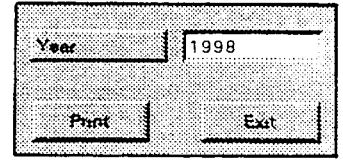
FIG. 31

MISSING ENROLLMENT APPLICATIONS

■ XYZ Company
12345 Somewhere Ave.
Los Angeles, CA 90046

Contact: Mr. Kai Palffy
Telephone: (818) 123-4567
Facsimile: (818) 765-4321

The following eligible employees have not submitted an enrollment application

| Employee Name | Division | Social Security Number |
|---|---|---|
| Paul Anderson | | 888-88-8888 |
| Zahra Bakhtiyari | | 999-99-9999 |
| Gregory Balfoort | | 999-99-9999 |
| Tasnim Barkat | | 474-74-7474 |
| Hal N Bui | | 444-44-4444 |
| Patricia S Colello | | 000-00-0000 |
| Ajay V Garg | | 222-22-2222 |
| Neeta R Gorania | | 555-55-5555 |
| Reginald Odigie | | 333-33-3333 |
| Norma Perales | | 111-11-1111 |
| Suresh Pradhan | | 666-66-6666 |
| Kimberly S Thompson | | 222-22-2222 |
| Zohreh Torabian | | 222-22-2222 |

FIG. 34

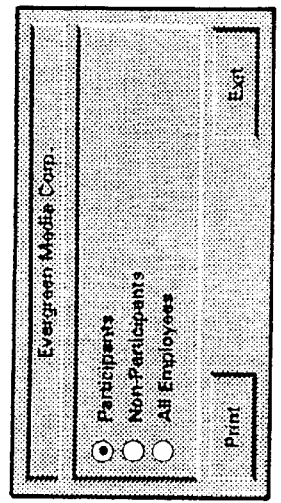

FIG. 35

401(K) CONTRIBUTION REPORT

Company: XYZ Company  
Division:  
Employee: Jennifer D Caldwell

May 31, 1998

Social Security #: 414-14-1414

You have chosen to allocate contributions to your 401(K) account among the following:

Hancock Regional Bank B    50%  
Hancock Special Equities B    50%

Pre-Tax Contribution Percentage  
Vested Percentage    #Name?

IMPORTANT  
Do not contact the mutual funds directly to make changes in your 401(K) investment account(s). Government regulations require that all changes in investment allocations, withdrawls, contributions and address of record be handled only through your employer. Changes in your 401(K) mutual fund account(s) not authorized by your employer can result in disqualification of the tax benefits of your contributions. It is the employee-participant's responsibility to periodically review his or her 401(K) accounts to verify contributions and investment selections.

CURRENT ACCOUNT ACTIVITY

| Period | Post Date | Employee Contribution Amount | Employer Contribution Amount |
|---|---|---|---|
| Jan | 01-31-98 | $ 500.00 | $ 150.00 |
| Feb | 02-28-98 | 500.00 | 150.00 |
| Mar | 03-31-98 | 500.00 | 150.00 |
| Apr | 04-30-98 | 500.00 | 150.00 |
| May | 05-31-98 | 500.00 | 150.00 |
| Jun | -- | -- | -- |
| Jul | -- | -- | -- |
| Aug | -- | -- | -- |
| Sep | -- | -- | -- |
| Oct | -- | -- | -- |
| Nov | -- | -- | -- |
| Dec | -- | -- | -- |
| total year-to-date contributions: | | $ 2,500.00 | $ 750.00 |

HISTORICAL ACCOUNT SUMMARY

| | |
|---|---|
| Total Employee Contributions (inception-to-date) | $ 5,390.63 |
| Total Employer Contributions (inception-to-date) | $ 1,482.19 |
| Total Rollovers (inception-to-date) | $ 0.00 |
| Total Trust-to-Trust Transfers (inception-to-date) | $ 0.00 |
| Total Adjustments (inception-to-date) | $ 0.00 |

FIG. 36

401(K) CONTRIBUTIONS RECAP -- DATA OUT

■ XYZ Company

■ As of May 31, 1998

|  | EMPLOYEE CONTRIBUTIONS | EMPLOYER CONTRIBUTIONS | TOTAL CONTRIBUTIONS |
|---|---|---|---|
| 01/31/98 | 14,358.81 | 1,599.89 | 15,958.70 |
| 02/28/98 | 14,755.23 | 2,310.60 | 17,065.83 |
| 03/31/98 | 15,838.17 | 2,579.53 | 18,417.70 |
| 04/30/98 | 15,228.96 | 3,589.90 | 18,818.86 |
| 05/31/98 | 16,883.07 | 4,039.81 | 20,922.88 |
| 06/30/98 | -- | -- | ---- |
| 07/31/98 | -- | -- | ---- |
| 08/31/98 | -- | -- | ---- |
| 09/30/98 | -- | -- | ---- |
| 10/31/98 | -- | -- | ---- |
| 11/30/98 | -- | -- | ---- |
| 12/31/98 | -- | -- | ---- |
| YEAR-TO-DATE TOTALS | 77,064.24 | 14,119.73 | 91,183.97 |

FIG. 37

EMPLOYEE/EMPLOYER CONTRIBUTIONS -- DATA OUT

■ XYZ Company

■ For the period ending May 31, 1998

Contribution data was received on 5/26/98 and processed on 5/28/98

| EMPLOYEE NAME | SOCIAL SECURITY NUMBER | VOLUNTARY EMPLOYEE CONTRIBUTION | EMPLOYER MATCHING CONTRIBUTION | W-2 COMPENSATION |
|---|---|---|---|---|
| Paul Anderson | 888-88-8888 | 0.00 | 0.00 | 5,176.68 |
| Ron I Askar | 000-00-0000 | 256.56 | 76.97 | 2,850.68 |
| Ye H Aung | 808-08-0808 | 300.00 | 90.00 | 2,916.68 |
| Zahra Bakhtiyari | 999-99-9999 | 0.00 | 0.00 | 2,500.00 |
| Gregory Balfoort | 999-99-9999 | 0.00 | 0.00 | 4,166.68 |
| Tasnim Barkat | 474-74-7474 | 0.00 | 0.00 | 3,100.68 |
| Noel E Bell | 666-66-6666 | 1,333.69 | 0.00 | 19,052.78 |
| Hal N Bui | 444-44-4444 | 0.00 | 0.00 | 2,267.34 |
| Van Khanh Bui | 777-77-7777 | 400.00 | 120.00 | 2,666.68 |
| Ruth Burr-Knittle | 242-42-4242 | 326.31 | 233.84 | 4,661.55 |
| Jennifer D Caldwell | 414-14-1414 | 500.00 | 150.00 | 3,633.34 |
| Patricia S Colello | 000-00-0000 | 0.00 | 0.00 | 3,017.34 |
| Teresa F Crew | 161-61-6161 | 665.96 | 499.79 | 4,439.68 |
| Kevin Dang | 777-77-7777 | 400.00 | 120.00 | 2,666.68 |
| Hai P Davis | 222-22-2222 | 410.06 | 344.45 | 4,100.68 |
| Phillip E Deckard | 464-64-6464 | 0.00 | 0.00 | 2,500.00 |
| Samuel A DiBari | 222-22-2222 | 81.26 | 39.81 | 4,062.50 |
| Kevin T Dinh | 707-07-0707 | 184.20 | 149.36 | 3,684.00 |
| Trieu V Dinh | 606-06-0606 | 578.13 | 232.26 | 3,854.17 |
| Dominic E Fortino | 181-81-8181 | 1,089.63 | 340.27 | 10,896.25 |
| Ajay V Garg | 222-22-2222 | 0.00 | 0.00 | 3,626.68 |
| Julie L Gaukel | 141-41-4141 | 713.52 | 111.44 | 7,135.13 |
| Brian G Gehl | 333-33-3333 | 34.12 | 30.72 | 487.50 |
| Jeff P Gehl | 484-84-8484 | 34.12 | 30.72 | 487.50 |
| Patricia A Gehl | 676-76-7676 | 0.00 | 0.00 | 2,319.96 |
| Patrick P Gehl | 454-54-5454 | 981.76 | 0.00 | 19,635.00 |
| Kevin S Gniadek | 787-87-8787 | 0.00 | 0.00 | 4,664.18 |
| Neeta R Gorania | 555-55-5555 | 0.00 | 0.00 | 1,875.00 |
| Olga Gorelik | 777-77-7777 | 0.00 | 0.00 | 0.00 |
| Dennis M Griffith | 111-11-1111 | 166.67 | 0.00 | 3,974.37 |
| James C Harvey | 252-52-5252 | 163.36 | 129.21 | 3,267.34 |
| Brian K Ingarfill | 353-53-5353 | 918.08 | 0.00 | 6,120.54 |

*FIG. 38*

CONTRIBUTIONS BY DIVISION - DATA OUT

- Evergreen Media Corp.
- For the period ending March 31, 1998

| DIVISION | PAYROLL CODE | TOTAL EMPLOYEE CONTRIBUTIONS | TOTAL EMPLOYER MATCHING | TOTAL MONTHLY EARNINGS |
|---|---|---|---|---|
| (Unassigned) | | $0.00 | $0.00 | $0.00 |
| AM-FM | 7VT | $0.00 | $0.00 | $253,615.55 |
| B.A. | MWL | $4,669.30 | $0.00 | $116,786.30 |
| CORP | VPT | $12,873.35 | $0.00 | 12,684,395.19 |
| EXTRAS | | $1,060.31 | $0.00 | $0.00 |
| K101 | KGQ | $9,762.98 | $0.00 | $219,188.92 |
| KKBT | WWP | $9,237.86 | $0.00 | $500,084.14 |
| KKSF | 7BV | $12,737.80 | $0.00 | $265,486.03 |
| KMEL | GKW | $12,439.80 | $0.00 | $242,381.14 |
| KSKY | NCQ | $0.00 | $0.00 | $13,033.20 |
| KTRH / KLOL | HXX | $32,082.16 | $0.00 | $960,312.83 |
| KYLD | NMX | $11,445.44 | $0.00 | $168,898.60 |
| WEDR | 6RT | $3,393.30 | $0.00 | $124,911.75 |
| WGAY | NRJ | $9,528.09 | $0.00 | $222,062.85 |
| WJJZ | MWE | $7,753.94 | $0.00 | $205,951.90 |
| WJLB | 6RQ | $4,480.72 | $0.00 | $167,151.23 |
| WJMN / WXKS | MWG | $31,486.76 | $0.00 | $614,374.07 |
| WKQI | NCN | $10,549.53 | $0.00 | $163,663.76 |
| WKTU | LUN | $18,847.86 | $0.00 | $568,878.48 |
| WLUP / WMVP | VPU | $8,711.86 | $0.00 | $346,979.81 |
| WMXD | 6RS | $4,788.77 | $0.00 | $167,774.79 |
| WNIC / WDOZ | NCP | $15,874.87 | $0.00 | $395,754.90 |
| WNUA | MWC | $11,424.60 | $0.00 | $284,469.40 |
| WRCX | HZP | $10,094.49 | $0.00 | $216,867.15 |
| WTOP / WASH | GKV | $8,671.19 | $0.00 | $181,179.67 |
| WVAZ | LUT | $13,670.20 | $0.00 | $268,728.74 |
| WVCG | VPS | $840.00 | $0.00 | $21,409.88 |
| WWRC | NRH | $517.20 | $0.00 | $33,417.09 |
| WWWW / WDFN | NET | $11,458.43 | $0.00 | $240,747.11 |
| WYXR | MWD | $6,701.97 | $0.00 | $191,139.90 |
| All Divisions | | $285,102.78 | $0.00 | 19,839,644.38 |

FIG. 39

YEAR-TO-DATE CONTRIBUTION STATISTICS

- Evergreen Media Corp.
- As of March 31, 1998
- Eligible Employees Only

| DIVISION | PARTICIPANTS | NON PARTICIPANTS | AVERAGE MONTHLY CONTRIBUTION PERCENTAGE | AVERAGE MONTHLY CONTRIBUTION AMOUNT | PERCENTAGE OF PARTICIPATION |
|---|---|---|---|---|---|
| AM-FM | 1 | 32 | 0.0% | $0.00 | 3% |
| B.A. | 13 | 4 | 5.3% | $534.91 | 76% |
| CORP | 15 | 27 | 3.5% | 1,154.30 | 36% |
| EXTRAS | 6 | 0 | 64.0% | $525.17 | 100% |
| K101 | 13 | 26 | 9.8% | $922.67 | 33% |
| KKBT | 10 | 20 | 6.8% | $973.06 | 33% |
| KKSF | 20 | 16 | 9.9% | $755.18 | 56% |
| KMEL | 21 | 16 | 6.9% | $604.14 | 57% |
| KSKY | 0 | 4 | 0.0% | $0.00 | 0% |
| KTRH / KLOL | 43 | 47 | 7.6% | $668.59 | 48% |
| KYLD | 17 | 16 | 10.0% | $814.78 | 52% |
| WEDR | 16 | 14 | 4.1% | $224.52 | 53% |
| WGAY | 16 | 11 | 7.6% | $630.71 | 59% |
| WJJZ | 14 | 12 | 6.6% | $577.39 | 54% |
| WJLB | 13 | 21 | 6.3% | $395.75 | 38% |
| WJMN / WXKS | 50 | 32 | 7.8% | $678.68 | 61% |
| WKQI | 18 | 13 | 9.3% | $756.47 | 58% |
| WKTU | 28 | 15 | 7.0% | $590.08 | 65% |
| WLUP / WMVP | 20 | 46 | 8.2% | $517.46 | 30% |
| WMXD | 17 | 14 | 5.8% | $481.84 | 55% |
| WNIC / WDOZ | 27 | 9 | 8.8% | $749.55 | 75% |
| WNUA | 20 | 17 | 10.6% | $742.34 | 54% |
| WRCX | 17 | 25 | 7.7% | $627.15 | 40% |
| WRFX / WFNZ | 0 | 1 | 0.0% | $0.00 | 0% |
| WTOP / WASH | 39 | 40 | 8.8% | $244.29 | 49% |
| WVAZ | 22 | 23 | 7.1% | $623.89 | 49% |
| WVCG | 1 | 4 | 10.7% | $980.00 | 20% |
| WWRC | 2 | 9 | 11.5% | $328.15 | 18% |
| WWWW / WDFN | 25 | 41 | 9.5% | $545.82 | 38% |
| WYXR | 17 | 24 | 6.5% | $407.58 | 41% |
| All Divisions (weighted) | 521 | 579 | 7.9% | $614.59 | 47% |

FIG. 40

YEAR-TO-DATE CONTRIBUTIONS SUMMARY -- DATA OUT

■ XYZ Company

■ As of May 31, 1998

| EMPLOYEE NAME | SOCIAL SECURITY NUMBER | YEAR-TO-DATE VOLUNTARY EMPLOYEE CONTRIBUTION | YEAR-TO-DATE EMPLOYER MATCHING CONTRIBUTION | YEAR-TO-DATE W-2 COMPENSATION |
|---|---|---|---|---|
| Paul Anderson | 888-88-8888 | 0.00 | 0.00 | 16,876.53 |
| Ron I Askar | 000-00-0000 | 1,305.30 | 391.60 | 14,503.40 |
| Ye H Aung | 808-08-0808 | 1,500.00 | 450.00 | 14,970.90 |
| Zahra Bakhtiyari | 999-99-9999 | 0.00 | 0.00 | 12,500.00 |
| Gregory Balfoort | 999-99-9999 | 0.00 | 0.00 | 11,333.24 |
| Tasnim Barkat | 474-74-7474 | 0.00 | 0.00 | 15,036.72 |
| Noel E Bell | 666-66-6666 | 3,378.20 | 0.00 | 48,260.09 |
| Hal N Bui | 444-44-4444 | 0.00 | 0.00 | 11,534.70 |
| Van Khanh Bui | 777-77-7777 | 2,000.00 | 600.00 | 13,333.40 |
| Ruth Burr-Knittle | 242-42-4242 | 1,727.61 | 797.22 | 24,679.87 |
| Jennifer D Caldwell | 414-14-1414 | 2,500.00 | 750.00 | 17,916.70 |
| Patricia S Colello | 000-00-0000 | 0.00 | 0.00 | 15,086.70 |
| Teresa F Crew | 161-61-6161 | 3,544.42 | 1,613.33 | 23,629.25 |
| Kevin Dang | 777-77-7777 | 1,200.00 | 360.00 | 8,000.04 |
| Hai P Davis | 222-22-2222 | 2,050.30 | 1,428.57 | 20,503.40 |
| Phillip E Deckard | 464-64-6464 | 0.00 | 0.00 | 12,500.00 |
| Samuel A DiBari | 222-22-2222 | 426.30 | 39.81 | 21,312.50 |
| Kevin T Dinh | 707-07-0707 | 921.00 | 527.40 | 18,420.00 |
| Trieu V Dinh | 606-06-0606 | 1,245.67 | 541.45 | 18,687.53 |
| Dominic E Fortino | 181-81-8181 | 4,058.28 | 849.12 | 40,582.59 |
| Ajay V Garg | 222-22-2222 | 0.00 | 0.00 | 3,626.68 |
| Julie L Gaukel | 141-41-4141 | 2,467.80 | 297.52 | 27,707.43 |
| Brian G Gehl | 333-33-3333 | 170.60 | 112.64 | 2,437.50 |
| Jeff P Gehl | 484-84-8484 | 170.60 | 112.64 | 2,437.50 |
| Patricia A Gehl | 676-76-7676 | 0.00 | 0.00 | 9,174.90 |
| Patrick P Gehl | 454-54-5454 | 4,908.80 | 0.00 | 98,175.00 |
| Kevin S Gniadek | 787-87-8787 | 0.00 | 0.00 | 31,771.25 |
| Neeta R Gorania | 555-55-5555 | 0.00 | 0.00 | 5,798.08 |
| Olga Gorelik | 777-77-7777 | 0.00 | 0.00 | 0.00 |
| Dennis M Griffith | 111-11-1111 | 166.67 | 0.00 | 3,974.37 |
| James C Harvey | 252-52-5252 | 816.80 | 471.05 | 16,336.70 |

*FIG. 41*

401(K) LOAN PAYMENT REPORT

Company: XYZ Company  
Division:  
Employee: Ruth Burr-Knittle

May 31, 1998

Social Security #: 242-42-4242

You have chosen to allocate loan payments to your 401(K) account among the following:

| | |
|---|---|
| Hancock Regional Bank B | 35% |
| Evergreen Small Company Growth B | 30% |
| MFS Emerging Growth B | 35% |

IMPORTANT
Do not contact the mutual funds directly to make changes in your 401(K) investment account(s). Government regulations require that all changes in investment allocations, withdrawls, contributions and address of record be handled only through your employer. Changes in your 401(K) mutual fund account(s) not authorized by your employer can result in disqualification of the tax benefits of your contributions. It is the employee-participant's responsibility to periodically review his or her 401(K) accounts to verify loan payments and investment selections.

CURRENT ACCOUNT ACTIVITY

| Period | Post Date | Post-tax Loan Payment Amount |
|---|---|---|
| Jan | 01-31-98 | $ 64.34 |
| Feb | 02-28-98 | 64.34 |
| Mar | 03-31-98 | 64.34 |
| Apr | 04-30-98 | 64.34 |
| May | 05-31-98 | 64.34 |
| Jun | -- | -- |
| Jul | -- | -- |
| Aug | -- | -- |
| Sep | -- | -- |
| Oct | -- | -- |
| Nov | -- | -- |
| Dec | -- | -- |
| total year-to-date loan payments: | | $ 321.70 |

HISTORICAL ACCOUNT SUMMARY

| | |
|---|---|
| Loan Inception Date | 01-Jun-97 |
| Beginning Loan Amount | $ 3,303.00 |
| Interest Rate | 7.00% |
| Loan Term | 60 Months |
| Remaining Loan Balance | $ 3,151.92 |

FIG. 42

401(K) AFTER-TAX LOAN RECAP -- DATA OUT

- XYZ Company
- as of MAY 28, 1998

|  | LOAN PAYMENTS |
|---|---|
| 01/31/98 | 350.30 |
| 02/28/98 | 350.30 |
| 03/31/98 | 350.30 |
| 04/30/98 | 350.30 |
| 05/31/98 | 350.30 |
| 06/30/98 | -- |
| 07/31/98 | -- |
| 08/31/98 | -- |
| 09/30/98 | -- |
| 10/31/98 | -- |
| 11/30/98 | -- |
| 12/31/98 | -- |
| YEAR-TO-DATE TOTALS | 1,751.50 |

FIG. 43

EMPLOYEE AFTER-TAX LOAN PAYMENTS -- DATA OUT

■ XYZ Company

■ MAY 1 through MAY 31, 1998

| EMPLOYEE NAME | SOCIAL SECURITY NUMBER | EMPLOYEE LOAN PAYMENT |
|---|---|---|
| Ruth Burr-Knittle | 242-42-4242 | 64.34 |
| Hai P Davis | 222-22-2222 | 169.84 |
| Dominic E Fortino | 181-81-8181 | 116.12 |
| | | $ 350.30 |

FIG. 44

401(K) LOANS ALLOCATION SUMMARY -- DATA OUT

■ XYZ Company

■ MAY 1 through MAY 31, 1998

Plan Administrator:

Send the copy of the attached 401(K) ALLOCATION ROSTER with payments and mutual fund applications to the mutual fund companies as designated below. Make checks payable to the mutual fund companies and use the addresses provided.

| | | |
|---|---|---|
| Evergreen Funds | check amount: | $19.30 |
| 200 Berkeley Street | | |
| Boston, MA 02116 | | |
| ATTN: Mr. Ken Johnson | | |
| (800) 225-2618 | | |
| Hancock John Mutual Funds | check amount: | $262.03 |
| 101 Huntington Ave. | | |
| Boston, MA 02199 | | |
| ATTN: Justin Whitaker | | |
| (800) 225-6020 | | |
| MFS Family of Funds | check amount: | $68.97 |
| 500 Boylston Street | | |
| Boston, MA 02116 | | |
| ATTN: Inner Circle | | |
| (800) 637-6374 | | |
| | Total contributions: | $350.30 |

FIG. 45

401(K) LOANS ALLOCATION ROSTER -- DATA OUT

THIS FORM SHOULD BE SENT WITH THE MAY CONTRIBUTIONS CHECK TO EVERGREEN FUNDS AT THE ADDRESS LISTED BELOW. USE A DEPENDABLE OVERNIGHT DELIVERY SERVICE TO EXPEDITE PROCESSING AND TRACK SHIPPING/RECEIVING DATES.

■ XYZ Company        FEDERAL I.D. # 12-3456789

■ MAY 1998 ORDER for...

Evergreen Small Company Growth B
200 Berkeley Street

Boston, MA 02116
ATTN: Mr. Ken Johnson

---

Evergreen Small Company Growth B      Cusip: 30023C731

This report lists the allocations to be made to the Evergreen Small Company Growth B. Please distribute the $19.30 of the enclosed $19.30 check among the following accounts within the XYZ Company 401(K) plan:

| EMPLOYEE NAME | FUND NUMBER | INVESTMENT ACCOUNT NUMBER | ALLOCATION AMOUNT |
|---|---|---|---|
| Ruth Burr-Knittle | 051 | | $19.30 |
| EVERGREEN SMALL COMPANY GROWTH B TOTAL ALLOCATION FOR MAY 1998 | | | $19.30 |

FIG. 46

401(K) ALLOCATION SUMMARY -- DATA OUT

■ XYZ Company

■ MAY 1 through MAY 31, 1998

Plan Administrator:

Send the copy of the attached 401(K) ALLOCATION ROSTER with payments and mutual fund applications to the mutual fund companies as designated below. Make checks payable to the mutual fund companies and use the addresses provided.

| | | |
|---|---|---|
| Evergreen Funds<br>200 Berkeley Street<br><br>Boston, MA 02116<br>ATTN: Mr. Ken Johnson<br>(800) 225-2618 | check amount: | $1,146.83 |
| Hancock John Mutual Funds<br>101 Huntington Ave.<br><br>Boston, MA 02199<br>ATTN: Justin Whitaker<br>(800) 225-6020 | check amount: | $8,508.13 |
| MFS Family of Funds<br>500 Boylston Street<br><br>Boston, MA 02116<br>ATTN: Inner Circle<br>(800) 637-6374 | check amount: | $11,267.92 |
| | Total contributions: | $20,922.88 |

FIG. 47

401(K) ALLOCATION ROSTER -- DATA OUT

THIS FORM SHOULD BE SENT WITH THE MAY CONTRIBUTIONS CHECK TO HANCOCK JOHN MUTUAL FUNDS AT THE ADDRESS LISTED BELOW. USE A DEPENDABLE OVERNIGHT DELIVERY SERVICE TO EXPEDITE PROCESSING AND TRACK SHIPPING/RECEIVING DATES.

■ XYZ Company                                                                FEDERAL I.D. # 12-3456789

■ MAY 1998 ORDER for...

Hancock Emerging Growth B
    101 Huntington Ave.

Boston, MA 02199
    ATTN: Justin Whitaker

---

Hancock Emerging Growth B                                                    Cusip:   478032204

This report lists the allocations to be made to the Hancock Emerging Growth B. Please distribute the $2,261.56 of the enclosed $8,508.13 check among the following accounts within the XYZ Company 401(K) plan:

| EMPLOYEE NAME | FUND NUMBER | INVESTMENT ACCOUNT NUMBER | ALLOCATION AMOUNT |
|---|---|---|---|
| Samuel DiBari | 160 | 1604520796 | $30.26 |
| Dominic Fortino | 160 | 0491003057452 | $571.96 |
| Patrick Gehl | 160 | 0496100080961 | $981.76 |
| Jeff Gehl | 160 | 0496000081532 | $64.84 |
| Brian Gehl | 160 | 0496000081612 | $64.84 |
| James McCormick | 160 | 0494000239802 | $457.23 |
| Nam Phan | 160 | 1605060379 | $90.67 |

HANCOCK EMERGING GROWTH B TOTAL ALLOCATION FOR MAY 1998           $2,261.56

FIG. 48

GENERIC MUTUAL FUND APPLICATION

MFS Family of Funds

This form contains all the information data entry requires to establish a new non-prototype trust account with your fund. Attached to this signed form is a signed account application; Investor agrees to all terms and conditions specified in the fund prospectus and attached application.

Please call Pension Service Associates at (818) 501-4015 if you have any questions.

REGISTRATION
- Name: XYZ Company, Inc. TTEE DTD 1/1/89 401(K) Plan FBO: Dennis Griffith
- Federal Tax ID: 12-3456789
- U.S. Citizen: Yes
- Mailing Address:
- Telephone:
- Notes:

INVESTMENTS

| | |
|---|---|
| MFS Research B | $58.34 |
| MFS Emerging Growth B | $58.33 |

INSTRUCTIONS

1. Data Entry
Alpha-sort this account by investor's last name, not employer's company name.

2. Exempt from Tax Reporting
This is a qualified retirement trust account, and as such is exempt from U.S. withholding and tax reporting requirements.

3. Reinvestment
Reinvest all income dividends and capital gains distributions in additional shares.

4. Telephone Exchanges
The investor authorizes the fund or its agents to honor telephone or other instructions from the broker of record or the owner/trustee to exchange shares of this account for investments into any other eligible fund with the same registration as this account.

5. Telephone Redemptions
Such are NOT permitted in this account.

DEALER INFO
- Dealer: Pension Service Associates Securities Corp.
- Home Office: 15130 Ventura Boulevard, Suite 320, Sherman Oaks, CA 91403
- Telephone: (818) 501-4015
- Rep. Num.: 115
- Branch Office:

N.A.S.D. Rep.: Jim Gilbert

SIGNATURE

I have read the prospectus and application for the fund in which I am investing and agree to their terms. I am of legal age, and the plan administrator of the above-named qualified retirement plan.

Under penalties of perjury I certifiy (1) that the number shown above is my correct taxpayer identification number and (2) that I am not subject to backup withholding because (a) I have not been notified that I am subject for failing to report all interest or dividends or (b) the Internal Revenue Service has notified me that I am no longer subject to backup withholding.

X _____    _____
Plan Administrator                                         Date

FIG. 49

Monthly 401(K) Contributions Verification - Data Out

- XYZ Company
- For the period ending May 31, 1998
-

| EMPLOYEE NAME | SOCIAL SECURITY NUMBER | VOLUNTARY EMPLOYEE CONTRIBUTION | EMPLOYER MATCHING CONTRIBUTION | W-2 COMPENSATION |
|---|---|---|---|---|
| Anderson, Paul | 888-88-8888 | 0.00 | 0.00 | 5,176.68 |
| Askar, Ron I | 000-00-0000 | 256.56 | 76.97 | 2,850.68 |
| Aung, Ye H | 808-08-0808 | 300.00 | 90.00 | 2,916.68 |
| Bakhtiyari, Zahra | 999-99-9999 | 0.00 | 0.00 | 2,500.00 |
| Balfoort, Gregory | 999-99-9999 | 0.00 | 0.00 | 4,166.68 |
| Barkat, Tasnim | 474-74-7474 | 0.00 | 0.00 | 3,100.68 |
| Bell, Noel E | 666-66-6666 | 1,333.69 | 0.00 | 19,052.78 |
| Bui, Hal N | 444-44-4444 | 0.00 | 0.00 | 2,267.34 |
| Bui, Van Khanh | 777-77-7777 | 400.00 | 120.00 | 2,666.68 |
| Burr-Knittle, Ruth | 242-42-4242 | 326.31 | 233.84 | 4,661.55 |
| Caldwell, Jennifer D | 414-14-1414 | 500.00 | 150.00 | 3,633.34 |
| Colello, Patricia S | 000-00-0000 | 0.00 | 0.00 | 3,017.34 |
| Crew, Teresa F | 161-61-6161 | 665.96 | 499.79 | 4,439.68 |
| Dang, Kevin | 777-77-7777 | 400.00 | 120.00 | 2,666.68 |
| Davis, Hai P | 222-22-2222 | 410.06 | 344.45 | 4,100.68 |
| Deckard, Phillip E | 464-64-6464 | 0.00 | 0.00 | 2,500.00 |
| DiBari, Samuel A | 222-22-2222 | 81.26 | 39.81 | 4,062.50 |
| Dinh, Kevin T | 707-07-0707 | 184.20 | 149.36 | 3,684.00 |
| Dinh, Trieu V | 606-06-0606 | 578.13 | 232.26 | 3,854.17 |
| Fortino, Dominic E | 181-81-8181 | 1,089.63 | 340.27 | 10,896.25 |
| Garg, Ajay V | 222-22-2222 | 0.00 | 0.00 | 3,626.68 |
| Gaukel, Julie L | 141-41-4141 | 713.52 | 111.44 | 7,135.13 |
| Gehl, Brian G | 333-33-3333 | 34.12 | 30.72 | 487.50 |
| Gehl, Jeff P | 484-84-8484 | 34.12 | 30.72 | 487.50 |
| Gehl, Patricia A | 676-76-7676 | 0.00 | 0.00 | 2,319.96 |
| Gehl, Patrick P | 454-54-5454 | 981.76 | 0.00 | 19,635.00 |
| Gniadek, Kevin S | 787-87-8787 | 0.00 | 0.00 | 4,664.18 |
| Gorania, Neeta R | 555-55-5555 | 0.00 | 0.00 | 1,875.00 |
| Gorelik, Olga | 777-77-7777 | 0.00 | 0.00 | 0.00 |

FIG. 50

Monthly 401(K) Contributions Proof Sheet

■ XYZ Company

■ For the period ending May 31, 1998

| EMPLOYEE NAME | Division | SOCIAL SECURITY NUMBER | VOLUNTARY EMPLOYEE CONTRIBUTION | EMPLOYER MATCHING CONTRIBUTION | W-2 COMPENSATION |
|---|---|---|---|---|---|
| Anderson, Paul | | 888-88-8888 | 0.00 | 0.00 | 5,176.68 |
| Askar, Ron I | | 000-00-0000 | 256.56 | 76.97 | 2,850.68 |
| Aung, Ye H | | 808-08-0808 | 300.00 | 90.00 | 2,916.68 |
| Bakhtiyari, Zahra | | 999-99-9999 | 0.00 | 0.00 | 2,500.00 |
| Balfoort, Gregory | | 999-99-9999 | 0.00 | 0.00 | 4,166.68 |
| Barkat, Tasnim | | 474-74-7474 | 0.00 | 0.00 | 3,100.68 |
| Bell, Noel E | | 666-66-6666 | 1,333.69 | 0.00 | 19,052.78 |
| Bui, Hal N | | 444-44-4444 | 0.00 | 0.00 | 2,267.34 |
| Bui, Van Khanh | | 777-77-7777 | 400.00 | 120.00 | 2,666.68 |
| Burr-Knittle, Ruth | | 242-42-4242 | 326.31 | 233.84 | 4,661.55 |
| Caldwell, Jennifer D | | 414-14-1414 | 500.00 | 150.00 | 3,633.34 |
| Colello, Patricia S | | 000-00-0000 | 0.00 | 0.00 | 3,017.34 |
| Crew, Teresa F | | 161-61-6161 | 665.96 | 499.79 | 4,439.68 |
| Dang, Kevin | | 777-77-7777 | 400.00 | 120.00 | 2,666.68 |
| Davis, Hai P | | 222-22-2222 | 410.06 | 344.45 | 4,100.68 |
| Deckard, Phillip E | | 464-64-6464 | 0.00 | 0.00 | 2,500.00 |
| DiBari, Samuel A | | 222-22-2222 | 81.26 | 39.81 | 4,062.50 |
| Dinh, Kevin T | | 707-07-0707 | 184.20 | 149.36 | 3,684.00 |
| Dinh, Trieu V | | 606-06-0606 | 578.13 | 232.26 | 3,854.17 |
| Fortino, Dominic E | | 181-81-8181 | 1,089.63 | 340.27 | 10,896.25 |
| Garg, Ajay V | | 222-22-2222 | 0.00 | 0.00 | 3,626.68 |
| Gaukel, Julie L | | 141-41-4141 | 713.52 | 111.44 | 7,135.13 |
| Gehl, Brian G | | 333-33-3333 | 34.12 | 30.72 | 487.50 |
| Gehl, Jeff P | | 484-84-8484 | 34.12 | 30.72 | 487.50 |
| Gehl, Patricia A | | 676-76-7676 | 0.00 | 0.00 | 2,319.96 |
| Gehl, Patrick P | | 454-54-5454 | 981.76 | 0.00 | 19,635.00 |
| Gniadek, Kevin S | | 787-87-8787 | 0.00 | 0.00 | 4,664.18 |
| Gorania, Neeta R | | 555-55-5555 | 0.00 | 0.00 | 1,875.00 |
| Gorelik, Olga | | 777-77-7777 | 0.00 | 0.00 | 0.00 |
| Griffith, Dennis M | | 111-11-1111 | 166.67 | 0.00 | 3,974.37 |
| Harvey, James C | | 252-52-5252 | 163.36 | 129.21 | 3,267.34 |
| Ingarfill, Brian K | | 353-53-5353 | 918.08 | 0.00 | 6,120.54 |
| Jaffeson, Jennifer M | | 111-11-1111 | 0.00 | 0.00 | 0.00 |

FIG. 51

Y-T-D 401(K) Contributions Verification - Data Out

- XYZ Company
- As of May 31, 1998
-

| EMPLOYEE NAME | SOCIAL SECURITY NUMBER | VOLUNTARY EMPLOYEE CONTRIBUTION | EMPLOYER MATCHING CONTRIBUTION | W-2 COMPENSATION |
|---|---|---|---|---|
| Anderson, Paul | 888-88-8888 | 0.00 | 0.00 | 16,876.53 |
| Askar, Ron I | 000-00-0000 | 1,305.30 | 391.60 | 14,503.40 |
| Aung, Ye H | 808-08-0808 | 1,500.00 | 450.00 | 14,970.90 |
| Bakhtiyari, Zahra | 999-99-9999 | 0.00 | 0.00 | 12,500.00 |
| Balfoort, Gregory | 999-99-9999 | 0.00 | 0.00 | 11,333.24 |
| Barkat, Tasnim | 474-74-7474 | 0.00 | 0.00 | 15,036.72 |
| Bell, Noel E | 666-66-6666 | 3,378.20 | 0.00 | 48,260.09 |
| Bui, Hal N | 444-44-4444 | 0.00 | 0.00 | 11,534.70 |
| Bui, Van Khanh | 777-77-7777 | 2,000.00 | 600.00 | 13,333.40 |
| Burr-Knittle, Ruth | 242-42-4242 | 1,727.61 | 797.22 | 24,679.87 |
| Caldwell, Jennifer D | 414-14-1414 | 2,500.00 | 750.00 | 17,916.70 |
| Colello, Patricia S | 000-00-0000 | 0.00 | 0.00 | 15,086.70 |
| Crew, Teresa F | 161-61-6161 | 3,544.42 | 1,613.33 | 23,629.25 |
| Dang, Kevin | 777-77-7777 | 1,200.00 | 360.00 | 8,000.04 |
| Davis, Hai P | 222-22-2222 | 2,050.30 | 1,428.57 | 20,503.40 |
| Deckard, Phillip E | 464-64-6464 | 0.00 | 0.00 | 12,500.00 |
| DiBari, Samuel A | 222-22-2222 | 426.30 | 39.81 | 21,312.50 |
| Dinh, Kevin T | 707-07-0707 | 921.00 | 527.40 | 18,420.00 |
| Dinh, Trieu V | 606-06-0606 | 1,245.67 | 541.45 | 18,687.53 |
| Fortino, Dominic E | 181-81-8181 | 4,058.28 | 849.12 | 40,582.59 |
| Garg, Ajay V | 222-22-2222 | 0.00 | 0.00 | 3,626.68 |
| Gaukel, Julie L | 141-41-4141 | 2,467.80 | 297.52 | 27,707.43 |
| Gehl, Brian G | 333-33-3333 | 170.60 | 112.64 | 2,437.50 |
| Gehl, Jeff P | 484-84-8484 | 170.60 | 112.64 | 2,437.50 |
| Gehl, Patricia A | 676-76-7676 | 0.00 | 0.00 | 9,174.90 |
| Gehl, Patrick P | 454-54-5454 | 4,908.80 | 0.00 | 98,175.00 |
| Gniadek, Kevin S | 787-87-8787 | 0.00 | 0.00 | 31,771.25 |
| Gorania, Neeta R | 555-55-5555 | 0.00 | 0.00 | 5,798.08 |
| Gorelik, Olga | 777-77-7777 | 0.00 | 0.00 | 0.00 |

FIG. 52

CLIENT LIST

| CLIENT NAME | PHONE | FAX | ADDRESS | CONTACT | FEDERAL ID | REP # | VESTING FORMULA | OVERNIGHT SHIPPING | NOTES |
|---|---|---|---|---|---|---|---|---|---|
| XYZ Company | (818) 123-4567 | (818) 765-4321 | 12345 Somewhere Ave Los Angeles, CA 90046 | Kai Palffy | 12-3456789 | 115 | /100/100/100/100/100/ | | |

FIG. 55

Distributions During 1997

■ XYZ Company

| Date | Activity | Employee Name | STATION | Social Security Number | Amount |
|---|---|---|---|---|---|
| 02/01/97 | Distribution | Jonas, Paul A | | 434-34-3434 | (129.40) |
| 02/01/97 | Distribution | Jonas, Paul A | | 434-34-3434 | (87.67) |
| 02/01/97 | Distribution | Malhotra, Rajinder K | | 898-98-9898 | (12,336.78) |
| 02/01/97 | Distribution | Malhotra, Rajinder K | | 898-98-9898 | (5,580.18) |
| 04/01/97 | Distribution | Preston, Rob D | | 131-31-3131 | (275.37) |
| 04/01/97 | Distribution | Preston, Rob D | | 131-31-3131 | (335.04) |
| 04/01/97 | Distribution | Preston, Rob D | | 131-31-3131 | (254.92) |
| 04/01/97 | Distribution | Preston, Rob D | | 131-31-3131 | (296.56) |
| 04/01/97 | Distribution | Preston, Rob D | | 131-31-3131 | (284.75) |
| 9 Distribution(s) During 1997 | | | | | (19,580.67) |
| 07/01/97 | Exchange | Gaukel, Julie L | | 141-41-4141 | 1,193.40 |
| 07/01/97 | Exchange | Gaukel, Julie L | | 141-41-4141 | (1,881.22) |
| 07/01/97 | Exchange | Gaukel, Julie L | | 141-41-4141 | 1,193.39 |
| 07/01/97 | Exchange | Gaukel, Julie L | | 141-41-4141 | 1,193.39 |
| 07/01/97 | Exchange | Gaukel, Julie L | | 141-41-4141 | (2,892.35) |
| 07/01/97 | Exchange | Gaukel, Julie L | | 141-41-4141 | 1,193.39 |
| 6 Exchange(s) During 1997 | | | | | 0.00 |
| 04/01/97 | Loan Distribution | Burr-Knittle, Ruth | | 242-42-4242 | (88.64) |
| 04/01/97 | Loan Distribution | Burr-Knittle, Ruth | | 242-42-4242 | (644.00) |
| 04/01/97 | Loan Distribution | Burr-Knittle, Ruth | | 242-42-4242 | (204.70) |
| 04/01/97 | Loan Distribution | Burr-Knittle, Ruth | | 242-42-4242 | (207.78) |
| 04/01/97 | Loan Distribution | Burr-Knittle, Ruth | | 242-42-4242 | (706.00) |
| 04/01/97 | Loan Distribution | Burr-Knittle, Ruth | | 242-42-4242 | (699.50) |
| 04/01/97 | Loan Distribution | Burr-Knittle, Ruth | | 242-42-4242 | (752.38) |
| 7 Loan Distribution(s) During 1997 | | | | | (3,303.00) |

FIG. 58

| Employee Name | Prior Year Salary | Current Year Estimated | Actual YTD Earnings | ADP Test Contribution | M Test Matching | Elig | HC | Key |
|---|---|---|---|---|---|---|---|---|
| | | 1998 | 160,000.00 | | Actual YTD Earnings | | | |
| Blair, Don E. | 31,800.08 | 34,000.08 | 8,500.02 | 480.00 | 0.00 | Yes | No | No |
| | 53,076.60 | 93,645.60 | 23,411.40 | 600.00 | 0.00 | Yes | Yes | Yes |
| | 31,145.72 | 36,999.84 | 9,249.96 | 750.00 | 0.00 | Yes | No | No |
| | 51,300.00 | 55,363.44 | 13,840.86 | 2,076.12 | 0.00 | Yes | No | No |
| | 5,000.00 | 30,000.00 | 7,500.00 | 300.00 | 0.00 | Yes | No | No |
| | 46,800.00 | 50,800.08 | 12,700.02 | 1,500.00 | 0.00 | Yes | No | No |
| | 101,404.08 | 111,403.92 | 27,850.98 | 2,250.00 | 0.00 | Yes | Yes | No |
| | 71,000.15 | 73,000.08 | 18,250.02 | 2,490.00 | 0.00 | Yes | No | No |
| | 138,924.00 | 136,404.00 | 34,101.00 | 1,560.00 | 0.00 | Yes | Yes | Yes |
| | 56,250.03 | 60,999.84 | 15,249.96 | 1,350.00 | 0.00 | Yes | Yes | No |
| | 146,156.50 | 136,404.00 | 34,101.00 | 2,250.00 | 0.00 | Yes | Yes | Yes |
| | 0.00 | 34,999.92 | 8,749.98 | 1,050.00 | 0.00 | Yes | No | No |
| | 45,649.92 | 47,049.84 | 11,762.46 | 1,500.00 | 0.00 | Yes | No | No |
| | 49,166.60 | 57,000.00 | 14,250.00 | 2,137.50 | 0.00 | Yes | No | No |
| | 64,552.54 | 69,077.28 | 17,269.32 | 2,590.38 | 0.00 | Yes | No | No |
| | 32,689.72 | 33,499.92 | 8,374.98 | 375.00 | 0.00 | Yes | No | No |
| | 80,500.08 | 82,999.92 | 20,749.98 | 2,499.00 | 0.00 | Yes | Yes | No |
| | 47,986.42 | 47,986.44 | 7,412.28 | 1,111.85 | 0.00 | Yes | No | No |
| | 26,722.95 | 34,000.08 | 8,500.02 | 300.00 | 0.00 | Yes | No | No |
| | 42,051.26 | 49,999.92 | 12,499.98 | 1,249.98 | 0.00 | Yes | No | No |
| | 51,426.80 | 60,000.00 | 15,000.00 | 2,250.00 | 0.00 | Yes | No | No |
| | 14,564.11 | 37,000.08 | 9,250.02 | 925.02 | 0.00 | Yes | No | No |
| | 66,029.76 | 69,077.28 | 17,269.32 | 1,200.00 | 0.00 | Yes | No | No |
| | 62,218.06 | 74,156.40 | 18,539.10 | 1,450.00 | 0.00 | Yes | No | No |
| | 9,000.00 | 67,333.20 | 16,833.30 | 1,683.31 | 0.00 | Yes | No | No |
| | 66,666.68 | 89,564.04 | 22,391.02 | 1,312.50 | 0.00 | Yes | Yes | No |
| | 96,000.00 | 106,000.08 | 26,500.02 | 1,060.02 | 0.00 | Yes | Yes | No |
| | 60,270.89 | 70,000.08 | 17,500.02 | 600.00 | 0.00 | Yes | No | No |
| | 57,447.56 | 64,999.92 | 16,249.98 | 1,624.98 | 0.00 | Yes | No | No |
| | 121,392.00 | 133,404.00 | 33,351.00 | 2,502.00 | 0.00 | Yes | Yes | Yes |
| | 40,633.68 | 45,712.80 | 11,428.20 | 1,200.00 | 0.00 | Yes | No | No |
| | 61,573.58 | 70,000.08 | 17,500.02 | 1,050.00 | 0.00 | Yes | No | No |
| | 0.00 | 34,999.92 | 8,749.98 | 600.00 | 0.00 | Yes | No | No |
| | 25,500.00 | 26,500.08 | 6,625.02 | 993.78 | 0.00 | Yes | No | No |
| | 54,320.56 | 64,999.92 | 16,249.98 | 812.52 | 0.00 | Yes | No | No |
| | 52,250.00 | 57,000.00 | 14,250.00 | 1,500.00 | 0.00 | Yes | No | No |
| | 45,649.92 | 47,049.84 | 11,762.46 | 900.00 | 0.00 | Yes | No | No |
| | 43,200.00 | 47,200.08 | 11,800.02 | 750.00 | 0.00 | Yes | No | No |
| | 30,000.00 | 30,799.92 | 7,699.98 | 450.00 | 0.00 | Yes | No | No |
| | 30,815.49 | 31,999.92 | 7,999.98 | 150.00 | 0.00 | Yes | No | No |
| | 82,499.94 | 90,000.00 | 22,500.00 | 562.50 | 0.00 | Yes | Yes | No |

Print    Exit

FIG. 59

401K USER SOFTWARE

BACKGROUND OF THE INVENTION

1. Field of Invention

The present invention relates generally to the field of computer-based retirement plan tracking and accounting. More specifically, the present invention is related to a computer-based application of a modified 401(k) retirement plan.

2. Discussion of Prior Art

Retirement plans, such as 401(k) plans, comprise a labyrinth of complex rules, accounting procedures, investment options, testing and reporting schemes and, as such, have heretofore been unmanageable to the average person or small business. Because of the above cited complexities, the normal course of action is to retain the services of a professional retirement administrator to setup, operate, test and otherwise supervise the overall retirement plan established for a group of individual employees.

Internal Revenue Code section 401(k) was devised to encourage workers to set aside money for their retirement years by allowing them to defer paying taxes on "retirement money" until retirement, at which time they would likely be in a lower tax bracket and, therefore, pay less total tax on the dollars.

Because 401(k) dollars aren't to sit idle while awaiting withdrawal (such would hardly make individual or national economic sense), an entire industry has formed around helping companies set up their 401(k) plans—and helping participants invest the dollars they defer into them.

Every 401(k) plan requires knowledgeable monitoring to ensure it stays in compliance with IRS regulations. Plans that include many services (loans, hardship withdrawals, automatic IRA rollovers upon distribution, etc.) and that allow a wide selection of investment opportunities can become very complex; their providers (often "third party administrators") charge accordingly. It's a fee that puts the 401(k) out of reach of many businesses. Providers of these plans also commonly assess a fee based on the number of employees eligible to participate in the plan (regardless of the number that actually do participate), and they often require a certain minimum level of actual participation—to ensure a minimum pool of investment dollars which will be earning the administrator fees and, possibly, brokerage commissions. Coming up with the base-fee capital, plus being able to meet the high eligible-employee and participation standards imposed by providers, effectively eliminates most small businesses from setting up a 401(k) plan.

The tremendous population not served by full-service, highly-customized 401(k) plans inspired some providers to create the "turnkey" plan. Turnkey plans are prefabricated and ready-to-use 401(k)s, with IRS-mandated documents, administration and investment options bundled together into one integrated package; participants' assets are pooled to create the commissionearning investment minimum desired by the providers. The plans are designed to be simple, easy-to-use and relatively low-cost—to both provider and end-user. Most insurance companies, mutual fund companies, and brokerage houses offer versions of the turnkey plan.

Unfortunately, the simplicity sought in the turnkey has also made it inflexible, presenting many clients with problems over time. For example, the bundled turnkey offered through a mutual fund company, or brokerage firm, makes it virtually impossible for an employer to change from the in-house investment selection-administration pairing chosen at the plan's outset. Another drawback is that many brokers and agents involved with 401(k) plans use the 401(k) as a vehicle for soliciting their clients' employees with additional investment products.

Offering unlimited access to virtually all SEC-regulated investment options—with no restrictions on the number of mutual fund families or their investments that a company can choose for its plan—is a far cry from the practices of typical "turnkey" products, such as those offered by mutual fund companies and insurance companies. In most turnkeys, the host company bundles a few proprietary investments with its in-house 401(k) administration; the result has been inflexible, relatively costly, and investment-sparse plans limited in their suitability to a wide range of participants—and greatly inhibiting to an employer having to change investment or administrative providers.

Conventional 401(k) plans fail to provide the flexibility to track individual investor accounts separately. Individual tracking enables unlimited new employee additions, unlimited investment options and tracking thereof, without modification of the remaining member accounts. The prior art has failed to provide for an end-user computer-based system allowing individualized accountability. Examples of existing prior art are described below.

The patent to Valentino (U.S. Pat. No. 4,648,037) provides for a method and apparatus of a communication system for enabling an employee to access information by a terminal concerning their up-to-date savings plans and the values thereof, withdrawal information, explanations of provisions, employee benefit information (e.g., group life insurance, disability coverage, vested retirement, etc.), explanations of savings plan and benefit options, and benefit news bulletins.

The patent to Halley et al. (U.S. Pat. No. 4,750,121) provides for an improved pension benefits system for enrolled employees of subscriber employers including a master trust institution and a life insurer institution. The master trust institution computes and receives each subscriber employer's periodic payment therein to based primarily upon that employer's number of current employees, their ages and monthly earnings; purchases and retains a life insurance policy from the life insurance institution covering each enrolled employee; invests in available securities to generate interest income; provides specific accurate future projections of periodic benefits for retirement, death, or disability; receives all life insurance policy proceeds upon the death of each enrolled employee; and distributes all periodic payable benefits. Funding a significant portion of payable periodic benefits by life insurance policy proceeds retained within the master trust institution is one truly unique feature of this system; life insurance having prescribed amounts of whole life and progressive one-year term dividend rider components is yet another.

The patent to Durbin et al. (U.S. Pat. No. 4,933,842) provides for an "Automated Investment Fund Accounting System", a computerized investment plan accounting system which manages data for investment plans with multiple participants and multiple investment funds.

The patent to Atkins (U.S. Pat. No. 4,953,085) provides for a "System For The Operation Of A Financial Account". A personal financial management program is disclosed incorporating means of implementing, coordinating, supervising, analyzing, and reporting upon investments in an array of asset accounts and credit facilities within a client account. Through a mathematical programming function, the client specifies his financial objectives, his risk preference, forecast of economic and financial variables, and budgetary constraints. The mathematical programming function suggests to the client a portfolio of investment and credit facilities to best realize his financial objectives over a defined time horizon.

The patent to Halley et al. (U.S. Pat. No. 4,969,094) provides for a self-implementing pension benefits system for subscriber employees (E1, E2, E3 . . . ) including a life insurer institution and a lending institution. A Life insurer trust institution computes and receives each subscriber employee's periodic payment therein to based primarily upon each subscriber employee's age and desired periodic benefits and issuing a life insurance policy covering each subscriber employee (E1, E2, E3 . . . ); providing specific accurate future projections of periodic benefits for retirement, death, or disability; and distributing all life insurance policy proceeds upon the death of each enrolled employee to the lending institution.

The patent to Wolfberg et al. (U.S. Pat. No. 4,994,964) provides a data processing system which monitors a client's business order over time, and based upon predetermined criteria, determines the client's vested interest in funds deposited into special client accounts. The business order data is stored in uniquely formatted client account files. In addition, a vesting account file stores summary data encompassing all the client files.

The patent to Harris et al. (U.S. Pat. No. 5,095,429) provides for a "Method For Prioritizing Data In Financial Information System." A method is disclosed for modifying calculation of predefined procedure in a spread of financial data in a financial information system operative on a digital computer wherein data is manually input into a cell as a value, the value is prioritized above other values dependent thereon by setting a lock flag to indicate that the data is to be secured against change by subsequent recalculation on the cell, and thereafter the data of all other cells which is not locked is recalculated on the basis of the priority values stored in cells designated as locked.

The patent to Fox (U.S. Pat. No. 5,132,899) provides for a "Stock And Cash Portfolio Development System" which combines data gathering and processing methodology with computer apparatus to produce a system whereby a list of stocks and a cash position is generated and purchased for investment and operating accounts.

The patent to Wolfberg et al. (U.S. Pat. No. 5,214,579) provides for a "Goal-Oriented Investment Indexing, Tracking And Monitoring Data Processing System." The data processing system manages, monitors, and reports the growth of a participant's investment base with respect to progress towards achieving a predetermined target amount selected by the participant.

The patent to Bailey (U.S. Pat. No. 5,227,967) provides for a "Security Instrument Data System Without Property Inapplicable Nulls." The patent discloses a system and method for storage and retrieval of investment asset data in a computer system, separates the data into many small files each of limited size and related to a functional attribute of the investment instrument.

Whatever the precise merits, features, and advantages of the above cited references, none of them achieve or fulfills the purposes of the present invention. Accordingly, it is an object of the present invention to provide for a computer-based 401(k) retirement plan which tracks individualized employee participant accounts. It is another object of the present invention to provide a computer-based solution to simplify 401(k) administration. These and other objects are achieved by the detailed description that follows.

SUMMARY OF THE INVENTION

Each employee-participant in the present invention has his or her own, individual, separate investment account for each mutual fund portfolio to which they invest or have invested in the past. This approach differs radically from traditional "pooled account" approaches, in which investment funds for all employees are co-mingled into a single, shared (or "pooled") investment account per mutual fund portfolio. For example, in the pooled account approach monies for all employees investing in "XYZ Cash Reserve Fund" (a mutual fund portfolio offered by XYZ) would be co-mingled in a single pooled account, with a single account number.

By contrast, in the individual investor account approach, each employee-participant who invests in "XYZ Cash Reserve Fund" would have his or her own, distinct mutual fund investment account. This account would hold monies solely for the selected employee-participant, and would have a unique account number. All other employees investing in "XYZ Cash Reserve Fund" would similarly have their own, unique investment accounts for that investment choice.

The invention facilitates this unique approach to 401(K) fund management by allowing the operator to specify a separate account number for each investment choice for each employee (see FIG. 8, element 880).

BRIEF DESCRIPTION OF THE DRAWINGS

FIGS. 9–59, collectively illustrate a series of preferred embodiment screen panels and reports.

DESCRIPTION OF THE PREFERRED EMBODIMENTS

Figure 1:
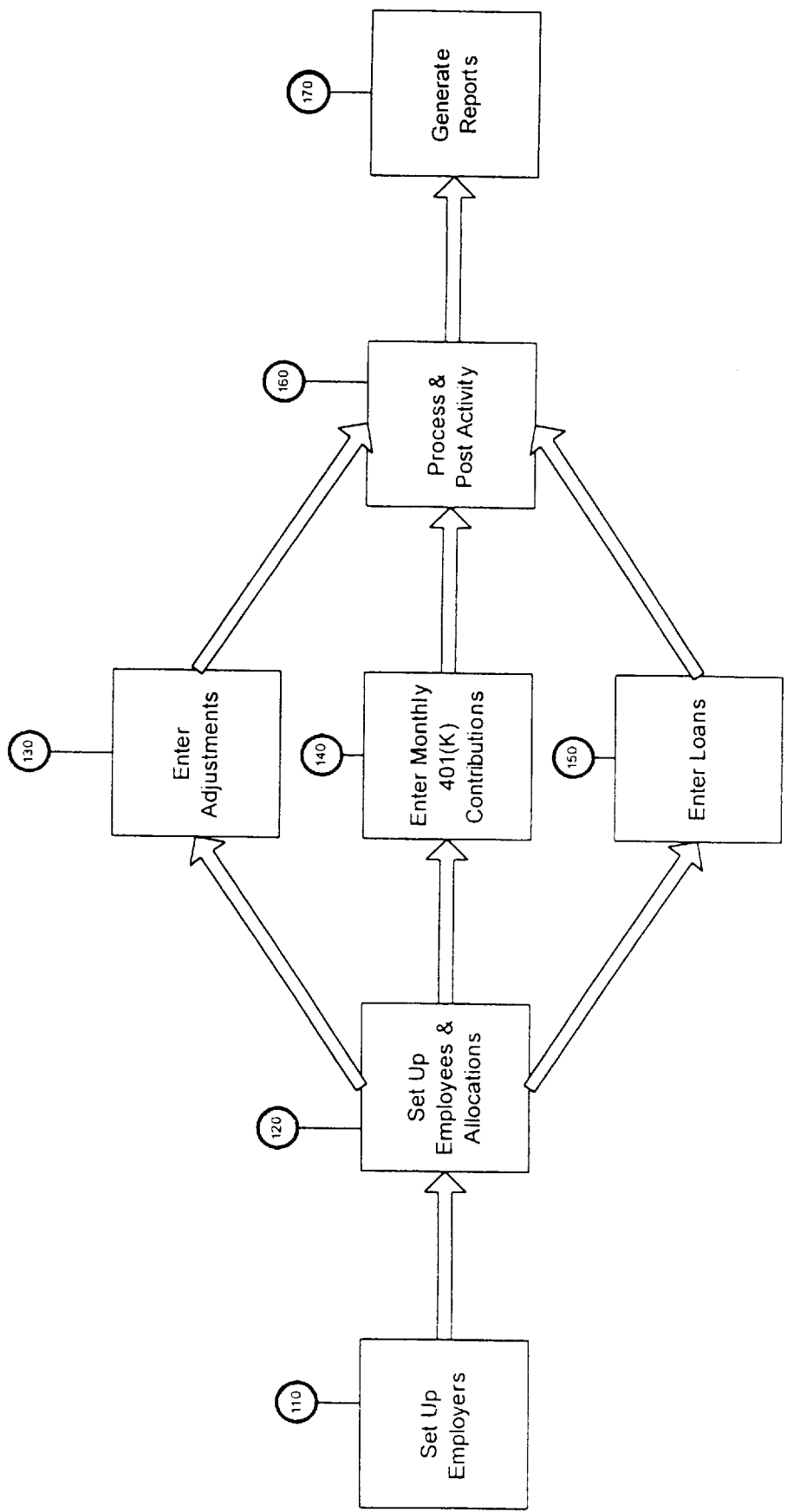
FIG. 1 illustrates a general overview of the present invention 401(k) plan.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

The present invention uses a relational database structure to maintain all information required to administer a 401(K) Plan using individual employee-participant accounts as opposed to traditional approaches using pooled 401(K)

accounts. In the preferred embodiment, Microsoft Access™ is the database of choice, but equivalent databases may be substituted without departing from the scope of the present invention. The invention makes maximum use of a relational database structure to streamline the administration of the 401(K) Plan and keep manual administrative overhead to a minimum.

FIG. 1 illustrates an overview of a general 401(k) plan. Each employer is setup 110 to include company and plan specifications. Each employee is then setup 120 to include employee information and selections of plan options (including allocations). Each month the employer tracks adjustments 130, contributions 140 and any loans 150. Software processes manipulate and catalog the input information 160 to produce testing, regulatory compliance, etc. and the generation of reports 170.

Figure 2:
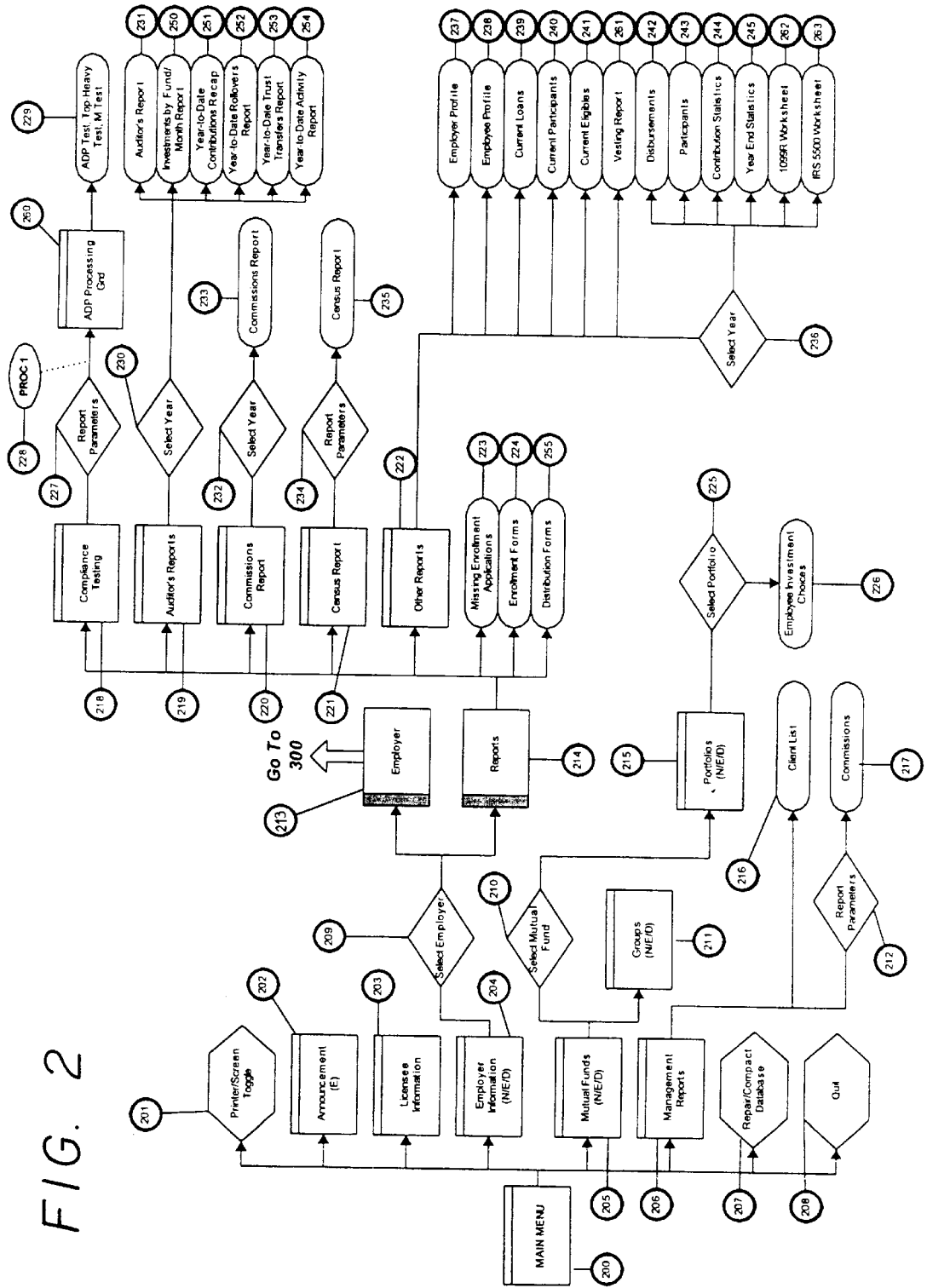
FIG. 2 illustrates a detailed flow diagram of the plan group.
Figure 3:
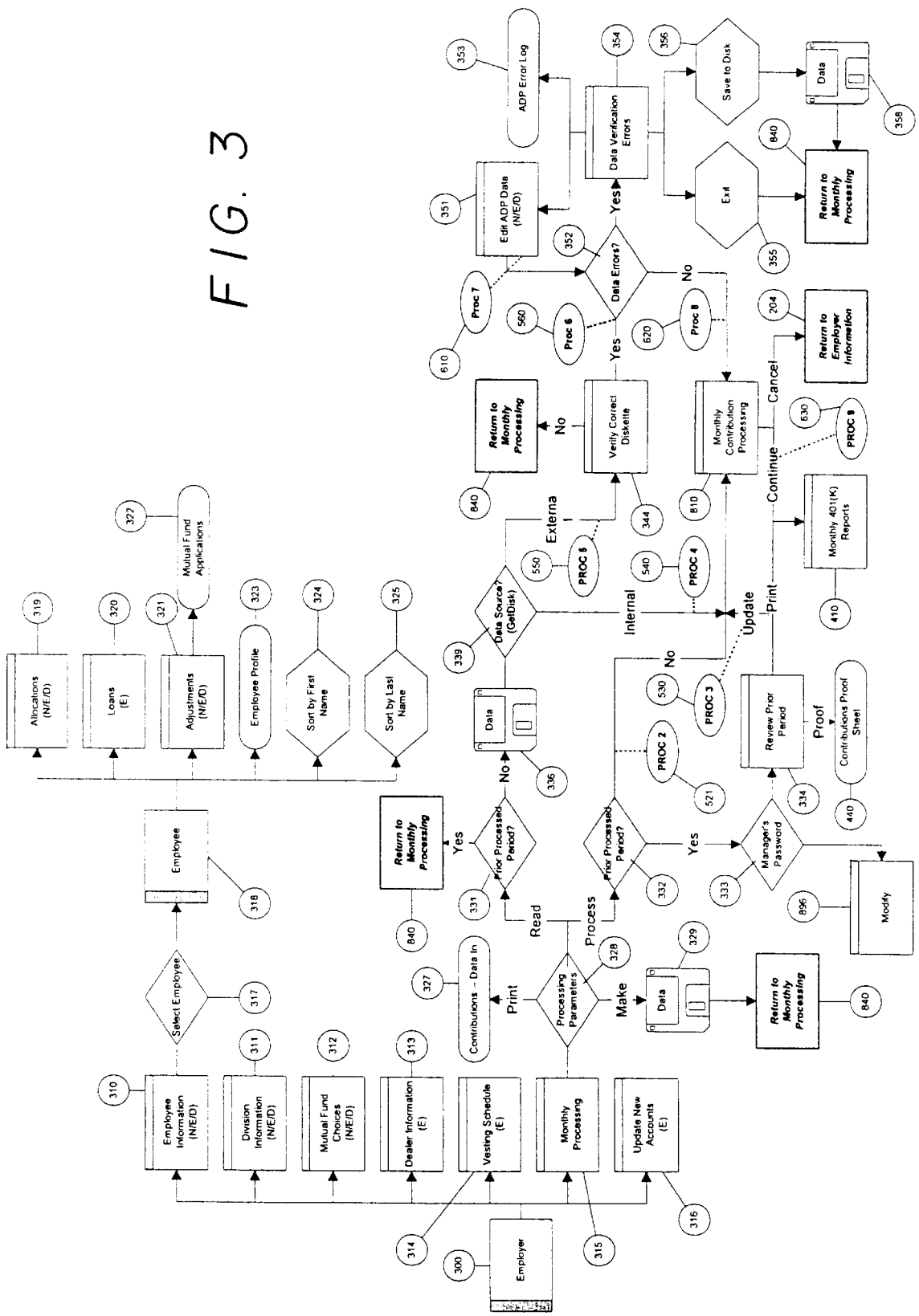
FIG. 3 illustrates a detailed flow diagram of the employer and employee setup and tracking.
Figure 4:
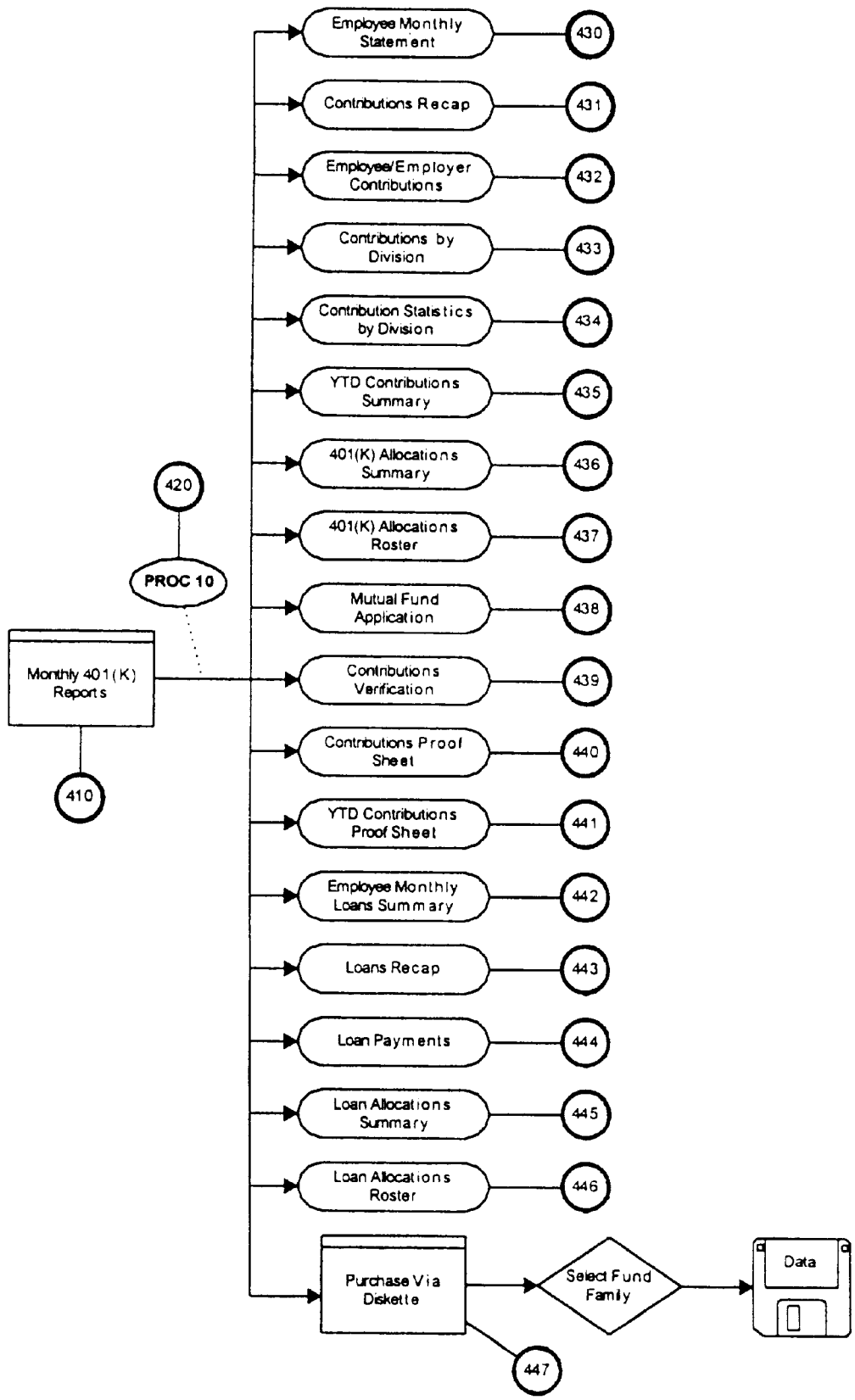
FIG. 4 illustrates a flow diagram of available monthly 401(k) reports.

FIG. 2 illustrates a partial flowchart of the present invention. The main menu 200 comprises the following selections: printer/screen toggle 201, announcement (E) 202 used for printing block text messages on monthly reports, licensee information 203 (purchaser of software), employer information (N/E/D-new/edit/delete) 204, mutual funds (N/E/D) 205, management reports 206, repair/compact database 207 and quit 208.

INVESTMENTS

The invention maintains a database of mutual fund families 205, 750 including the following information: name of mutual fund family, name of contact person, mailing address for purchases, telephone number. The primary purpose of this information is to organize individual mutual fund portfolios 215 (listing of available funds) into their respective mutual fund families. Using this information, the invention can generate reports that detail monthly purchasing information for each employee-participant for each portfolio within each mutual fund family. Groups of funds also may be defined 211 (e.g. fixed income).

Within each mutual fund family, the invention maintains a database of each allowable portfolio 790 that has been, or may be, used within 401(K) plans. The following information is stored for each portfolio: name of portfolio, cusip number, Quotron (ticker) symbol, fund number, commission rate (paid to broker), grouping. The commission rate is used to calculate the commissions earned by the broker of record for investments made by each employee-participant. The group field allows the user to group portfolios into custom-defined groups for specialized reporting needs.

A specific report—Employee Investment Choices by Fund 226—for each mutual fund portfolio 215, 225, lists each employee participant using that portfolio, their employer, their monthly allocation percentage, and their account number.

EMPLOYERS

The invention maintains a database of all participating employers 204, 300 including the following information: name of employer, name of contact person, federal tax identification number, mailing address, telephone, facsimile, courier delivery service, employer matching flag, enhanced statements flag, express delivery flag (for courier delivery), last period investments were processed, date of last processing, notes.

For each employer, the invention maintains Dealer Information 313 which specifies the information needed to automatically generate generic mutual fund applications for employee-participants to facilitate opening of new investment accounts as needed.

For each employer, the invention maintains a custom Vesting Schedule 314. The vesting schedule is applicable only for employers that offer a contribution matching plan for employees' 401(K) contributions. The vesting schedule defines the basis for vesting (calendar year or anniversary date), as well as vesting percentages for Year 1 through Year 6. The invention assumes that the employee-participant is fully (100%) vested at the end of six years. Other time periods can be selected without departing from the scope or functionality of the present invention.

For each employer, the invention allows the user to select which mutual fund portfolios are available and approved for employee-participants 312. These portfolios are selected from the database of mutual fund portfolios as described in the section titled "INVESTMENTS" (above).

For each employer, the invention maintains a database of all divisions (branches) of the employer 311. The following information is stored for each division: division name, division code, contact name, mailing address, telephone, facsimile.

For each employer, the invention provides an "Update New Accounts" screen 316. This screen shows the user a list of all employee-participant investment accounts for which account numbers have not yet been entered. This allows the user to easily update all new account numbers for employee-participants from one centralized screen.

For each employer, the invention stores a database of employees 310 which will be described in the section titled "EMPLOYEES" (below).

For each employer, the invention provides functionality for monthly processing 315, tracking, storing, and reporting on the employer's 401(K) plan as described in the section titled "MONTHLY PROCESSING" (below). A menu screen 328 enables a choice of month, date and type of input (parameters). An entry report 327 presents a grid to enter eligible employees, contributions, and matching. Blocks 331 and 334 allow review of previous periods and notification to user if this period had been previously processed.

FIG. 2 includes a plurality of reports 214:

ADP Test, M Test, Top Heavy Test 227, 229—these reports perform compliance testing 218 for each employer's 401(K) Plan.

Auditor's Report 219, 230, 231—shows a detailed account for each employer, of each investment, by each employee-participant, for the selected year.

Investments per Fund/Month 250—shows total investment for each employer, in each mutual fund, for each month, during a selected year.

YTD Contributions Recap 251—shows the total gross contributions for each employer, for each month, during the selected year.

YTD Rollovers 252—shows the total gross rollovers for each employer, for each month, during the selected year.

YTD Trust Transfers 253—shows the total gross trust transfers for each employer, for each month, during the selected year.

YTD Activity 254—shows total activity (contributions, loans, rollovers, trust transfers) for each employee-participant within each portfolio for the selected employer. Each portfolio is reported on a separate page.

Commissions Report 220, 232, 233—shows the commissions earned during the selected year for investments made by employee-participants of the selected employer.

Census Report 221, 234, 235—prints a grid of employees of the selected employer including: employee name, social security number, division, eligibility flag, participant flag, birth date, hire date, termination date, company officer flag, 1% owner flag, 5% owner flag, related to officer flag.

Other reports 222 include:

Employer Profile 237—prints a profile report for the selected employer.

Employee Profile 238—prints a profile report for the selected employee.

Current Loans 239—prints a roster of current loans for employee-participants of the selected employer.

Current Participants 240—prints a roster of current participants for the selected employer.

Current Eligibles 241—prints a roster of current eligible employees for the selected employer.

Disbursements During Year 242—prints a roster of disbursements for the selected employer during the selected year.

Participants During Year 243—prints a roster of participating employees for the selected employer during the selected year.

Contribution Statistics for Year 244—shows various contribution statistics (percentage of participation, average contribution amount, etc.) for the selected employer during the selected year.

Year End Statistics 245—shows additional statistics for the selected employer as of the end of the selected year.

Missing Enrollment Apps 223—prints a roster listing all employee-participants for the selected employer who are missing enrollment applications.

Enrollment Forms 224—prints an enrollment form for employee-participants which shows all available mutual fund investment choices and allows the enrollee to indicate percentage of monthly investments to be allocated to each fund choice.

Distribution Forms 255—prints distribution forms for activities including Rollovers, Trust Transfers, Liquidations, Loans, and Exchanges.

EMPLOYEES

The invention maintains a database of all employees 318 for each employer including: employee name 317, division, social security number, VIP status, mailing address, telephone, birth date, hire date, join date, termination date, contribution percentage, notes, officer flag, eligible flag, missing enrollment application flag, HC relative flag, participant flag, 5% owner flag, 1% owner flag, estimated salary, percent vested, employee ID number (system assigned). The estimated salary is automatically computed by the invention based on past salary history. The percent vested is automatically computed by the invention based on the vesting schedule for the related employer.

The invention allows sorting of the employee list by either first name 324 or last name 325.

For each employee, the invention maintains a database of each mutual fund portfolio the selected employee has chosen for investments 319, the allocation percentage, and the employee's account number for that portfolio. The invention only allows an employee to choose those mutual fund portfolios that are approved for use by the related employer. The Allocation screen automatically verifies that all allocation percentages for the selected employee total to 100%.

For each employee, the invention allows set-up and tracking of loans 320 against employee 401(K)s. The invention calculates the amortized monthly payment based on the principal, interest rate, and loan term. The invention allows overriding the computed amortized monthly payment with an employee's "desired" monthly payment. The invention will automatically compute the balance due against the loan as the employee-participant makes monthly payments.

For each employee, the invention allows entering and tracking adjustments 321, 322 including rollovers, trust transfers, exchanges, liquidations, and loans that affect the employee-participant's investment accounts.

Employee Profile 323—prints a profile report for the selected employee.

MONTHLY PROCESSING

The invention provides the ability to process employee-participant 401(K) contributions monthly for each employer 315. Monthly contribution amounts can either be entered manually into a pre-formatted grid 371 or read from a diskette 370 (339).

If the user selects to enter contributions manually, a grid will be displayed listing each eligible employee, their social security number, and columns for the employee-participant's monthly contribution, employer match (if applicable), loan repayment, and salary. As numbers are entered, the invention will provide validation checking 352 including:

Verify that the employee's contribution does not violate the maximum yearly contribution.

Verify that contributions are not entered for non-participating employees.

If contribution amounts are read from a diskette, the invention performs a variety of verification checks including:

Verify the name of the company and period match input 328 (344).

Isolate and append new employees referenced on the diskette but not already in the employees database. The invention isolates new employees by comparing each employee's social security number with those in the employee's database. New employees are automatically appended 351 to the database as employees with missing enrollment applications.

Verify that employees do not exceed the yearly contribution maximum 352, 354.

Verify that each employee making a contribution has defined his or her allocation choices.

Any errors are compiled and printed on an Error Log 353. Processing will not continue until all errors are resolved by the operator. Once errors have been resolved, the information will be transferred to the monthly contribution processing grid and processing will proceed as normal.

The keypad entry feature of the monthly contribution grid allows the operator to enter employee contributions using only the numeric keypad. Each employee can be referenced by the last five digits of their social security number.

The invention allows the operator to add a new employee into the database directly from the monthly processing grid and can generate a contribution verification report 439 directly from the monthly processing grid.

Once the operator has finished entering and verifying the information on the monthly processing grid, he or she can click a single button to process the information.

Processing the information performs the following tasks:

Save the aggregate monthly contribution for each employee-participant in the database.

Distribute the aggregate monthly contribution amongst each employee's investment choices based on their allocation percentage as defined on the employee's investment allocation screen and store the distributed amounts.

Update loan balances.

Once all processing has been completed the invention allows the user to generate the following monthly processing reports 410:

Employee Monthly Statement 430—statement for each employee-participant that shows monthly contributions over the course of the current year, as well as, inception-to-date totals.

Contributions Recap 431—shows the total contributions for each month of the selected year for the current employer.

Employee/Employer Contributions 432—shows the aggregate employee and employer contribution amounts for each employee-participant for the selected month.

Contributions by Division 433—shows total contributions for each division for the selected month.

Contribution Statistics by Division 434—shows contribution statistics for each division.

YTD Contributions Summary 435—shows employee and employer contribution amounts for each employee for the selected month.

401(K) Allocation Summary 436—shows the total investment amount for each mutual fund family for the current month. It also shows the mailing address of the mutual fund company to which checks should be mailed.

401(K) Allocation Roster 437—shows a roster of each employee-participant, his or her investment amount, and his or her account number for each mutual fund portfolio.

Mutual Fund Applications 438—generic mutual fund applications that print for each employee-participant for mutual fund portfolios without account numbers (indicating a new account).

Contributions Verification 439—shows each employee-participant's monthly contribution amount by division.

Contributions Proof Sheet 440—shows each employee-participant's monthly contribution amount.

YTD Contributions Proof Sheet 441—shows each employee-participant's yearly contribution amount.

Employee Monthly Loan Summary 442—statement for each employee-participant that shows monthly loan payments over the course of the current year, as well as, inception-to-date totals.

Loans Recap 443—shows the total loan payments for each month of the selected year for the current employer.

Loan Payments 444—shows the aggregate loan payment amounts for each employee-participant for the selected month.

Loan Allocation Summary 445—shows the total investment amount (loan payments) for each mutual fund family for the current month. It also shows the mailing address of the mutual fund company to which checks should be mailed.

Loan Allocation Roster 446—shows a roster of each employee-participant, his or her investment amount (loan payments), and his or her account number for each mutual fund portfolio.

ADMINISTRATIVE REPORTS

The invention prints the following administrative (management) reports 206:

Client List 216—prints a list of all employers in the database with the following information: employer name, telephone, facsimile, mailing address, contact name, federal tax identification number, rep identification number, vesting formula, overnight shipping information, notes.

Commissions 212, 216—prints a commissions report organized by Mutual Fund or Employer.

FIG. 7

MFIPortfolioInfo 710

Table containing the name, cusip number, and current share price of each mutual fund portfolio downloaded via the Mutual Interface.

Adjustments 720

Table containing adjustments such as trust to trust transfers, rollovers, exchanges, and miscellaneous contributions for each employee-participant.

MFIAccountPosition 730

Table containing information about each participant account downloaded through the Mutual Fund Interface. Information includes EmployeeID (of account holder), number of shares, and the cusip number of the mutual fund portfolio.

EmployeeMF 740

Table containing the current investment choices for each employee-participant.

MutualFundFamilies 750

Table containing name of mutual fund families currently offered as investment choices (e.g., John Hancock, MFS, Oppenheimer, etc.) along with address and contact information for each fund family.

MutualFunds 790

Table containing information for each mutual fund portfolio offered by the various mutual fund families. Information includes name of the portfolio, cusip number, and commission rate.

EmployeeInfo 780

Table containing information about each eligible employee in the database. Information includes name, social security number, address, phone, date of birth, etc.

AllocatedFunds 770

Table containing information about all processed allocations made for each employee-participant from inception-to-date. Information includes the period the allocation was made, amount of the allocation, mutual fund portfolio funds invested into, employee who made the allocation, etc.

ContributedFunds 760

Table containing information for the total investment made by each employee for each period. These funds are then divided amongst the employee's various allocation choices based on information in the EmployeeMF table (see above) and posted to the AllocatedFunds table (above).

EmployerInfo 791

Table containing information about each company who's 401(K) plan is being managed. Information includes company name, address, contact, phone number, fax number, etc.

Divisions 792

Table containing information about the various divisions, or branches, of each company.

EmployerMF 793

Table containing list of mutual fund portfolios being offered by each company to their employee-participants.

FundGroups 794

Table containing information about fund groupings which are used for internal reporting purposes. Examples of groups could be "International Equity Funds", or "Domestic Utility Funds", etc.

FIG. 8

This diagram shows a high level view of how monthly contribution information is allocated to each employee-participant's various investment choices and stored in the AllocatedFunds table; and eventually used to generate various management and end-user reports.

Block 810 refers to the "Monthly Contributions" screen, the data for which is stored in the ContributedFunds table (block 760). During the processing cycle, Process 9, (blocks 630, 631, and 632) these dollar amounts are divided according to employees' investment choices (stored in the EmployeeMF table and depicted by blocks 740, 860, 870, and 880).

For example, Employee 1 may make a monthly contribution of $400.00 to his 401(k) plan. This may then be divided into four different investment choices at a rate of 25%, 25%, 15%, and 35%. The resulting amounts ($100, $100, $60, and $140), together with the is investment choices they are allocated to, will be stored in the AllocatedFunds table (blocks 770 and 890).

The information in the AllocatedFunds table is then used to generate various monthly processing reports. Examples include the Allocation Roster, Allocation Summary, Monthly Statement, etc.

The information stored in the Mutual Fund Interface (blocks 710, 730, and 895) is further combined with the information in the AllocatedFunds table to generate Enhanced Statements—which show a combination of each employee-participant's contributions vs. their current account balance for each mutual fund portfolio to which they currently contribute or have contributed in the past.

The invention allows both the 401(K) administrators and employee-participants to realize many benefits as a result of this unique approach:

ENHANCED MONTHLY STATEMENTS 891, 892: Enhanced monthly statements show a combination of investment activity processed through the system, as well as up-to-date account balances. The current account balances are provided via the Mutual Fund Interface 895. This would not be possible in a pooled account approach as there would be no way to determine the portion of the pooled account that belongs to each employee-participant except through complex, time-consuming, and potentially error-prone analysis. Opening a new account, without having an account number, with the mutual fund company is an included option 893.

Additional reports 894 include, but are not limited to:

1. AD HOC SNAPSHOTS OF INVESTOR'S ENTIRE HOLDINGS: A "snapshot" showing the current account balance of each employee-participant's account holdings can be created quickly and easily. This is not possible in a pooled account approach due the same reasons stated in #1 above.

2. AD HOC TOTAL ASSET REPORTS FOR PLAN ADMINISTRATOR: Maintaining individual investment accounts for each employee-participant facilitates the quick generation of asset reports showing the current value of investment accounts for each employee.

Other benefits:

1. INVESTOR CAN INDEPENDENTLY VERIFY HIS OR HER INVESTMENT CHOICE AND ACCOUNT BALANCES WITH THE MUTUAL FUND COMPANY; DOES NOT NEED TO RELY SOLELY ON PLAN ADMINISTRATOR REPORTS: Investors can verify their current account balances by contacting the mutual fund companies directly and requesting the required information. This is not possible with a pooled approach as the mutual fund provider cannot isolate the funds for any individual investor within the pooled account.

2. FAST, EFFICIENT ADMINISTRATION AS ACCOUNTS ARE HELD SEPARATELY: Administrative functions such as disbursements, liquidations, rollovers, etc. can be processed quickly and efficiently as the exact current account value of each investment for each employee-participant can be determined at any time by simply contacting the mutual fund company. A pooled approach with co-mingled assets does not allow this flexibility as assets can usually only be released on a quarterly basis after a quarterly evaluation has been performed by the plan administrator.

3. AUTOMATIC IRA ROLLOVERS: Quick and efficient tax-deferred conversion of separate investor mutual fund accounts to qualified IRA rollovers at the mutual fund. This procedure allows the investor to maintain his or her shares and investment strategy despite separation from the employer's plan.

DISPLAY PANELS AND REPORTS FOR PREFERRED EMBODIMENT

FIGS. 9–59 illustrate a collection of screen panels illustrating a working example of the preferred embodiment. The terms "figure" and "panel" are to be considered interchangeable for purposes of describing FIGS. 9–59.

Welcome: (FIG. 9) "Home Page-main menu 200" of software, allowing User to select operations (each operation will be described below). Clicking the Printer/Screen button 201 allows paper reports to be printed out, or as an alternative, send the report image to the monitor screen for viewing. The ability to "print" to screen allows user to "see" output quickly and without wasting paper, as some reports are many pages long.

Announcement: (FIG. 10) Clicking the Announcement button 202 on the Welcome Panel allows the User to compose and print a multiple-line "announcement" on the participants' monthly statements. The employer can easily insert custom, timely announcements on the statements that are distributed to all 401(K) participants. These announcements appear in a special area of the statement, thereby "personalizing" the plan for the participants.

Licensee Information: (FIG. 11) Clicking the License button 203 on the Welcome Panel accesses licensee information. This feature enables pricing control over the product and its use. Each software product is modified in advance of delivery to each user, whose company name, Federal Tax ID Number, address, and number of eligible employees is entered into panel (and embedded into the software) prior to delivery. The initialized software is modified to perform 401(K) record keeping operations on a pre-set number of eligible employees. Typically the software will be marketed at a base price plus an additional nominal charge for each eligible employee. This initializing and pre-limiting feature provides the ability to charge companies with larger numbers of employees more for the product. In addition, as an additional security and copyright infringement deterrent, the User's name and federal ID # will be prominently printed on each page of printed output and all reports. If a user needs to open the plan to an expanding employee base, they simply purchases an expansion module, as is presently available from 401(K) Pro, Inc., 15130 Ventura Blvd., Ste. 320 Sherman Oaks, Calif. 91403, allowing for an additional group of eligible participants.

Employer Information: (FIG. 12) Clicking Client Data 204 button on Welcome Panel takes user to the Employer Information Panel. This is the "participant search engine" and "contributions data processing" part of the program. User can access from Employer Pull-Down Menus the following:

View Employees (FIG. 13) 310
View Divisions (FIG. 18) 311
Mutual Fund Choices (FIG. 19) 312
Dealer Information (FIG. 20) 313
Vesting Schedule (FIG. 21) 314
Monthly Processing (FIG. 22) 315
Update New Accounts (FIG. 26) 316
Batch Processing (FIG. 27)
Fiduciary Reports (FIG. 28)

User can access from Reports Pull-Down Menu the following:

Compliance Testing (FIG. 29) 218
Auditors Reports (FIG. 30) 219
Commission Reports (FIG. 31) 220
Census Reports (FIG. 32) 221
Other Reports (FIG. 33) 222
Missing Enrollment Apps (FIG. 34) 223
Mailing Labels (FIG. 35)

The present invention uses encryption when imbedding Employer information into program, to prevent Employer from infringing upon copyright, or p passing copies of program to other Employers.

Employee Information: (FIG. 13) By clicking View Employees 318 from the pull-down menu of the Employer Information Panel, the user has access to a scroll listing of eligible employees, sorted alphabetically by either first or last name, as convenience to user. User can insert important notes or reminders about each individual employee, and can configure stored data to the employee's key testing attributes (i.e. company officer, no application on file, relative of a highly-compensated employee, 5% owner, 1% owner). User can input estimated salary, employee's company ID#. Employee vesting percentage is then calculated. The date hired field is integrated into the company vesting schedule to calculate percent vested. The following aspects can be reached from the Employee Pull-Down Menu:

Allocations (FIG. 14) 319
Loans (FIG. 15) 320
Adjustments (FIG. 16) 321
Profile (FIG. 17) 323
Sort By First Name (FIG. 13) 324
Sort By Last Name (FIG. 13) 325

Allocations: (FIG. 14) Lists a participant's current (and past) mutual fund portfolio investment choices by name and cusip number, and percentage of participant's monthly contribution that is 5 ear-marked to each portfolio, as well as the date of most recent update of allocations. Portfolio choices and/or allocation percentages can be quickly modified by the employer per participant's instructions. Previous portfolio selections can remain in the grid, with a "zero" inserted for percentage, so that the investment choice (and attached mutual fund account number) has a "place holder" for future reference purposes. The grid illustrates the mutual funds account number and investment prefix for quick identification and verification of account information.

Employee Loan: (FIG. 15) This feature collects individual 401(K) loan data then calculates the 401(K) loan according to IRS guidelines. This feature has a provision for indicating whether the loan is for a primary residence, or other needs. Primary residence loans have a 10-year duration; other loans must be repaid in 5 years maximum. Information entered includes loan start date, principle loan amount, fixed interest rate, months loan will be outstanding. The program then calculates amortized monthly payment, total amortized value, total dollar amount of all payments, and total dollar amount balance due.

Employee Adjustments: (FIG. 16) Allows for the editing of numerical information required to correct errors or omissions on the part of the employer. This panel also lists rollovers into the plan, and distributions or loans out of the plan, and prints generic mutual fund applications for the employer's use in allocating the rollovers into the plan.

Employee Contribution History: (FIG. 17) Includes employee contribution history which lists the date, funds, account number, dollar amount, and characterizations of each contribution made to the 401(K) from inception-to-date, providing user with a detailed paper trail of all purchases into all participant's mutual fund accounts. Characterization of transactions include: employee contribution, employer contribution, rollover, or trust-to-trust transfer.

Division Information: (FIG. 18) User can input each division or business operating unit for analysis of plan and popularity of plan division-by-division. Contact information by division is input by user. This feature is especially useful to employers with geographically diversified business locations receiving payroll data from several disparate sites.

Employer Approved Portfolios: (FIG. 19) The employer approved portfolio's panel lists all mutual funds portfolios that the employer has pre-selected for inclusion in the company's plan. The advantage is that non-approved mutual fund investments cannot be utilized by employee participants. This Panel allows employer to add new portfolios at will.

Dealer Information: (FIG. 20) (Used by brokerage community and/or agents earning commissions from mutual fund portfolios). This Panel lists the name, address and contact information about the dealer. This information is automatically transferred to and impregnated in the generic mutual fund applications, so that the broker will be registered with the mutual fund investment company as the designated National Association of Securities Dealers (NASD) Broker of Record, thereby entitled to NASD-approved commissions.

Vesting Schedule: (FIG. 21) Pre-set, this sets down the employer-mandated vesting schedules that shall apply to the company plan. This panel adheres to basic IRS guidelines and limitations, and allows vesting to be calculated either on a calendar year or on an anniversary date of an employee. The percentage of vesting per each participant is transferred to other reports, including Participant's Monthly Statement and Employee's Profile.

Monthly Processing: (FIG. 22) This allows user to input the date payroll information was received and the date it was processed. It also contains historical information of previous processed periods. This panel also manufactures a specialized diskette which "pre-formats" the way payroll and wage data must be input into the program prior to monthly processing. The diskette allows contribution and wage data to be assembled "off-site" and then added to processing later, freeing up CPU for other operations. The program will automatically download and read the data input onto the diskette.

A Back-Door Data Modifications Panel 896 enables the user, armed with a security code, to enter the core database of the program and modify employee and employer contribution and other numerical values.

Employee/Employer Contributions 327—Data In Worksheet: (FIG. 23) As an alternative to diskette, the user can print-out a specialized worksheet that collects the same data, and the data can then be directly keyed-in to the system for processing. The advantage is that the employer has several ways by which to collect and input census and contribution data into the program prior to processing.

The monthly processing panel has a "fail safe" feature that requires the employer to select the proper month to process without inadvertently overriding data from previous months. The Monthly Processing Panel allows the user to select processed work from previous months, and edit and make changes if they become necessary. A manager's password is required before data from previous months can be edited or reprocessed.

Review Prior Period 334: (FIG. 24) Accessed via the Monthly Processing Panel, this allows the user to update or make changes to previous processing cycles, includes totals for contributions, matching contributions, and salary, thereby allowing the employer a quick double-check against non-401(K) records to verify the information. After information has been either corrected or verified, it can then be processed by the program.

Monthly 401(K) Reports 410: (FIG. 25) Accessed via the Monthly Processing Panel, this panel allows the user to select from a listing of reports precisely which reports to process and print. The advantage is the user has control over output. Available reports are:

A) Employee Monthly Statement for (a particular participant) is titled 401(K) Contribution Report 430. A User can scroll through participants listing and select single statement to print. 401(K) Contribution Report (FIG. 36) includes fields for current investment choices and percentage of contributions that are to go to each investment, a pre-tax contribution field, year-to-date current contribution activity and total, inception-to-date employee and employer contributions, total rollovers, total trust-to-trust transfers, and adjustments. The Enhanced 401(K) Contribution Report (FIG. 36) includes purchase information by portfolio stored in the program cross-referenced with current portfolio values as reported via electronic download by the various mutual fund investment companies. The program has a unique, custom designed interface which scans the mass of downloaded mutual fund data and selects the information needed for this and other reports. This feature is called the MFI Interface (Mutual Fund Interface).

B) Employee Monthly Statements 430 (FIG. 36). The user can have all updated 401(K) Contribution Reports printed, in alphabetical order.

C) Contributions Recap—Data Out 431 (FIG. 37). An internal report for user showing all employee and employer contributions y-t-d.

D) Employee/Employer Contributions—Data Out 432 (FIG. 38). A monthly internal report for user, alpha-sorted by employee and reporting contributions for a specific month, and W-2 wage compensation for the same month. This Report is useful in verifying and cross-checking W-2 wage data, which is essential in compliance tests.

E) Contributions By Division 433 (FIG. 39). This lists divisions, payroll code, employee and employer contributions and total W-2 earnings by division. This is an internal report for verification purposes, and especially useful if an employer has several payrolls that merge into the 401(K).

F) Contribution Statistics By Division 434 (FIG. 40). This lists divisions, number of participants and eligible non-participants per division, the average monthly dollar and percentage contribution by division, and the percentage of participation by division. This report is not part of the ADP deferral testing, but is instead designed to assist the employer in assessing the overall popularity of the company's 401(K) plan, division-by-division. The report can be run to cover the entire employee base (company-wide) or it can be run on a divisional basis so the employer can assess the popularity of the 401(K) by division, and share the information with division managers.

G) YTD Contributions Summary 435 (FIG. 41). A year-to-date internal report, similar to information provided in the Employee/Employer Contributions—Data Out (see item D above).

H) Employee Monthly Loan Summary 442 (FIG. 42). Titled 401(K) Loan Payment Report, this report is provided to participant-borrowers and provides monthly updates on status of 401(K) loans. Information includes which portfolios the payments are going to (and percentage per portfolio), y-t-d payment activity, beginning loan balance, interest rate, terms, and remaining loan balance.

I) Loans Recap 443 (FIG. 43). Titled After-tax 401(K) Loan Payment Recap—Data Out, this internal report shows user how much in total after-tax money was used to repay loans. This Report is useful in verifying and cross-checking.

J) Loan Payments 444 (FIG. 44) Titled Employee After-tax 401(K) Loan Payments—Data Out, this internal report shows user the names of borrowers and their monthly loan repayments that were processed.

K) Loan Allocations Summary 445 (FIG. 45). Titled 401(K) Loans Allocation Summary—Data Out, this internal report tells user how many checks to write, and their amounts, and the mutual fund investment companies that are to receive the checks for loan repayments. Checks accompany the Loan Allocation Rosters (see item L below).

L) Loan Allocations Roster 446 (FIG. 46). Titled 401(K) Loans Allocation Roster—Data Out, this report is sent to the specific mutual fund investment company with an accompanying check. This report instructs the mutual fund investment company exactly which participants' accounts to fund, and provides name of participant and participant's individual account number, portfolio name, and cusip number of portfolio.

M) 401(K) Allocations Summary 436 (FIG. 47) This internal report tells user how many checks to write, and their amounts, and the mutual fund investment companies that are to receive the checks for monthly contributions. Checks accompany the 401(K) Allocations Roster (see item N below).

N) 401(K) Allocations Roster 437 (FIG. 48). Titled 401(K) Allocations Roster—Data Out, this report is sent to specific mutual fund, with accompanying payment for purchase check (see item M above). Report to each mutual fund investment company is sorted by portfolio, listing all participants using a specific investment portfolio, and the requisite account number and amount to be invested. For added verification and reliability, the portfolio name and cusip number is listed on each page, as is the employers name and federal ID#. The Report is designed to allow speedy, accurate key-in of purchase information by the mutual fund data entry departments.

The Program creates a pre-formatted diskette 447 that is sent, along with the printed hardcopy of the 401(K) Allocation Roster, to the mutual fund investment company. This diskette is formatted in a basic ASCII format and allows the mutual fund investment company to upload the purchases, account-by-account, as opposed to hand key entry of the purchases. In an alternative embodiment, the records are transferred using electronic transfer (e.g., ATM, PBX, Internet, e-mail, etc.).

O) Generic Mutual Fund Applications 438 (FIG. 49). Titled Generic Mutual Fund Application, this form is signed by the Plan Administrator and sent to the appropriate mutual fund investment company with payment and 401(K) Allocations Roster (see item 14 above). This form contains all the information necessary to open an individual 401(K) mutual fund account, and specifies the name of the participant, the plan name, the employer's federal ID number (or participant's social security number), the specific investment and dollar amount of initial purchase, and mailing address. The Form also contains NASD Dealer information if a broker or agent is involved in the transaction so the mutual fund investment company will know where to send commissions. The creation of this form automatically by the software is a huge advantage in speed and accuracy, and eliminates the need for user to pull an application from the investment prospectus and fill it in each time a new participant joins the plan, or each time a participant changes his or her investment choices.

P) Contributions Verification 439 (FIG. 50). Titled Monthly 401(K) Contributions Verification—Data Out, this internal report is used by employer to verify and compare the input against a payroll register to be sure all contributions are correct and accounted-for.

Q) Contributions Proof Sheet 440 (FIG. 51). Titled Monthly 401(K) Contributions (By Division) Verification, this internal report is used by employer to verify and compare the contribution and wage input against a payroll register to be sure all contributions are correct and accounted-for.

R) Y-T-D 401(K) Contributions Verification—Data Out 441 (FIG. 52). This internal report is used by employer to verify and compare the year-to-date contribution and wage input against a payroll register to be sure all contributions are correct and accounted-for.

Update New Accounts: (FIG. 26) The Update Due Accounts Panel lists employees, their selected investment portfolios, and account numbers as a way of inserting active or passive dormant mutual fund accounts into ongoing plan operations.

Batch Processing: (FIG. 27) The batch processing panel allows for efficient transaction input, in or out of the plan for the following types of transactions:

Loan Payments
Rollovers
Trust-to-Trust Transfers
Loan Distributions
Mutual Fund Exchanges
Liquidation
ADP Test Corrections
or, other adjustments It also allows for the addition of employees into the plan.

Fiduciary Reports: (FIG. 28) This panel allows the employer to coordinate beginning and ending balance information from the mutual fund account statements with the data base stored within the program. The coordination of beginning year, and ending year, account balances with stored employee contribution data allows for the production of reports that are useful to the auditors in preparing the year end IRS 5500. To simplify the creation of the fiduciary reports, the software manufactures a diskette which can be used off-site by a data entry person to load in mutual fund account data. This diskette can then be read back into the program prior to publication of the report. Large companies can use several of these diskettes simultaneously so that several employees can collect and upload data into the program for speedy creation of the fiduciary report.

Compliance Testing 218: (FIG. 29) The software performs a battery of IRS-mandated tests: ADP compliance testing of employee contributions, employer matching contributions, and top-heavy testing. Testing results are based upon calculations and formulas imbedded in the program. Calculations are based upon employees' actual or estimated payroll and wage data input by the user (either via diskette or manual key-in) combined with monthly contribution data, either actual or projected. Testing can be done for a current year or previous years and can be performed as frequently as the employer wishes. The user is given a choice of IRS-approved testing methodologies. The ability of frequent ad hoc compliance tests helps the employer anticipate the year-end results and head-off problems.

ADP Pre-Processing Grid 260 is an ADP Testing "What-IF" feature (FIG. 59) which allows user to insert trial wage and contribution data for testing purposes, or to calculate how much money needs to be either added or removed to correct a failed year-end ADP Test.

Vesting Report 261: Report for an employer with a contribution matching program, shows name of participants, social security number, inception date of vesting for each participant, current vesting percentage, employer contribution for each participant, and net vested dollar amount for each participant.

1099R Worksheet Report 262: Report for an employer to use to speedup the collection of key data for completion of mandatory IRS Form 1099R forms to notify government and participant of distributions from the plan and their taxability. Data includes names of all persons who received a distribution in the current or previous year, amount of distribution, and type of distribution.

Auditor's Report 219: (FIG. 30) Reports can be created by user on an ad hoc basis. Their purpose is to assist the user (and Plan's auditors) in preparing a preliminary IRS Form 5500 263 or 5500C. Auditor's Reports are based upon the synthesis of stored data and user-input data. The user inputs both beginning (i.e. January 1st.) and year-end (i.e. December 31st.) dollar balance information derived from each separate mutual fund account. Between these two dates and balances the software inserts all contribution and related transaction information (i.e. rollovers, loan withdrawals and payments, share exchanges, corrections, hardship withdrawals, etc.) that occurs within the designated timeframe. Auditors can quickly verify account activity on a micro scale or macro scale. Reports are organized by user to fit auditor's requirements. Reports can be alpha-sorted by participant, by investment portfolio, by investment "type" or group. Reports render a complete overview of all the basic financial activity that occurred within the employer's plan for the year designated.

Commissions (For one Client Only): (FIG. 31)

Management Reports 206: (FIG. 53) Includes-Commission Reports 217 (FIG. 54 below), and_Client List Report 216 (FIG. 55, below).

Commissions Reports: (FIG. 54) The software allows for Broker Commission Reports that are useful to a broker who earns commission from the contribution purchase activity into the plan. The user defines the year of the report; the program provides detailed year-to-date data, organized by mutual fund company or broker's client. These reports allow the broker a reasonable approximation of future income and receivable paid by various mutual fund companies. The Broker can use reports to calculate approximately how much income is forthcoming, and from which mutual fund companies. In addition, broker can evaluate the income resulting from his or her client base.

Client List Report 216: (FIG. 55) Report used by brokerage community to list out all 401(K) plans and their respective employers.

Print Employee Census 221: (FIG. 32) Ad hoc report lists all employees eligible to participate in the 401(K), employees not eligible to participate in the 401(K), employees who are eligible but have no enrollment application on file, terminated employees, and employees subdivided by division, job classification, or business unit.

Employer Reports: (FIG. 33) Listed as "Other Reports 222" in the Reports Pull-Down Menu, this panel provides a series of miscellaneous reports available to user on an ad hoc basis. User has a quick way of listing participants with loans outstanding, current participants, current eligible, distributions and other disbursements YTD and relevant statistics. The user can select the year of report.

Missing Enrollment Applications Report 223: (FIG. 34) A report for user to see which employees are listed in the system as eligible non-participants, but no completed enrollment application is on file. By law, all eligible employees must complete an enrollment form, even if they choose to decline participation. This report notifies user of employees who have not submitted a form for company files.

Print Employee Labels: (FIG. 35) The software generates mailing lists and mailing labels of various key groups: plan participants, eligible non-participants, and all employees in the database. These lists and labels are useful in broadcasting important information throughout the company, or targeting a specific group (i.e. eligible non-participants) about a specific upcoming event or deadline (i.e. open enrollment period).

Mutual Funds 205: (FIG. 56) The Mutual Funds Panel lists funds by company and contains contact information and phone numbers. New mutual fund companies can be added by the user and within each mutual fund company specific portfolios can also be added.

Portfolios 215: (FIG. 57) The Portfolios Panel includes the name of the portfolio, the cusip number, the ticker symbol, the fund number assigned by the mutual investment company, the commission percentage if any paid to the broker, and the group that this portfolio is assigned to. The group information is a unique feature that allows portfolios from several different mutual fund companies to be organized under an investment objective criteria for use by the auditors in assembling the IRS 5500. It is also useful to the employer in determining what classification of investments the plan participants are allocating their contributions to. The group feature described above is user defined and can be as general or as specific as the user selects.

Distributions Report 255: (Report 58) Another report lists all distributions by year, and user can select the year. This report lists the employee's name, their business division, social security number, and amount of distribution. The exact amount of the distribution is input by the user who derives the distribution amount from mutual funds statements.

CONCLUSION

Figure 5:
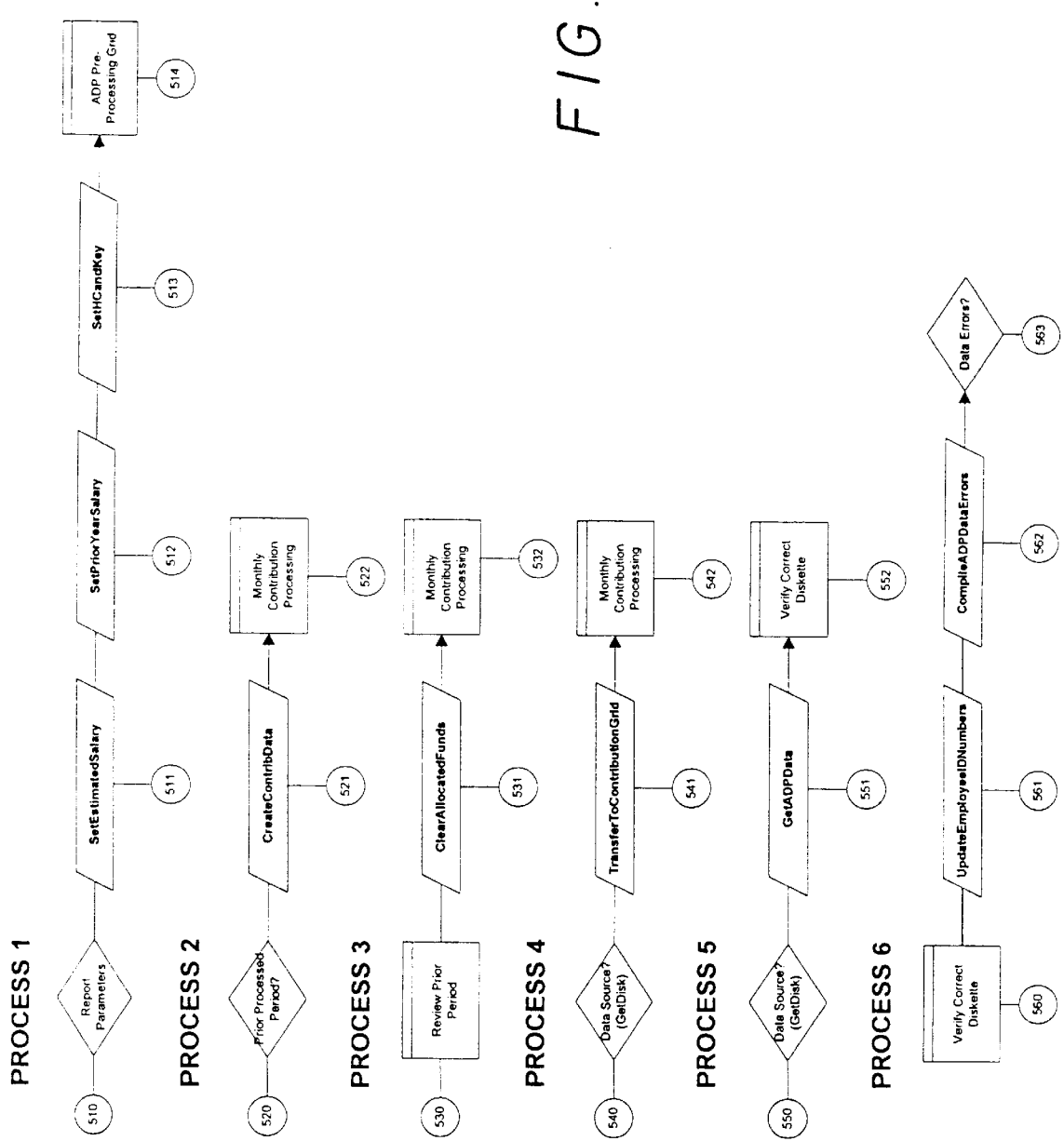
FIGS. 5 and 6, in combination, illustrate ADP processing functions 1–10.
Figure 6:
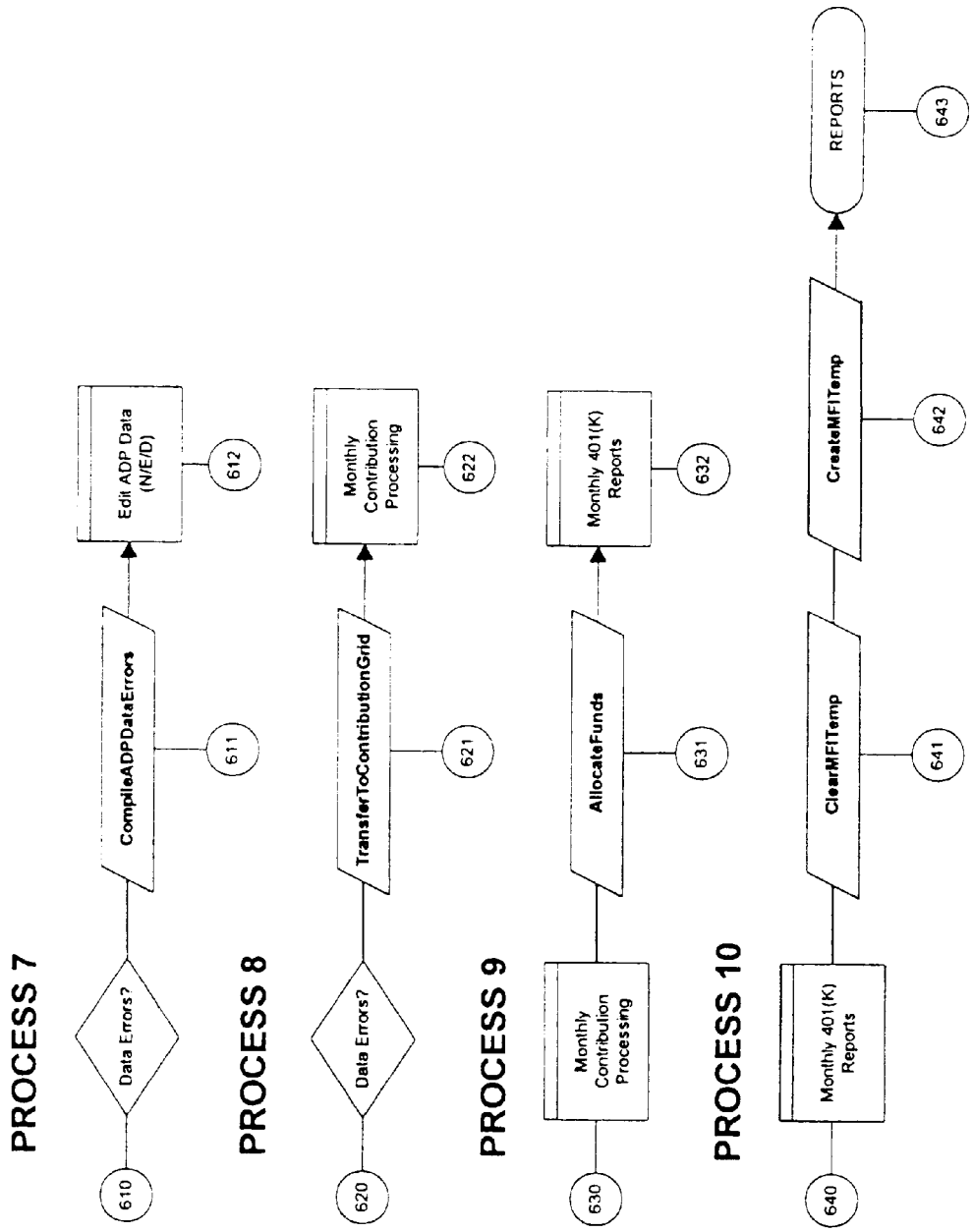
Figure 7:
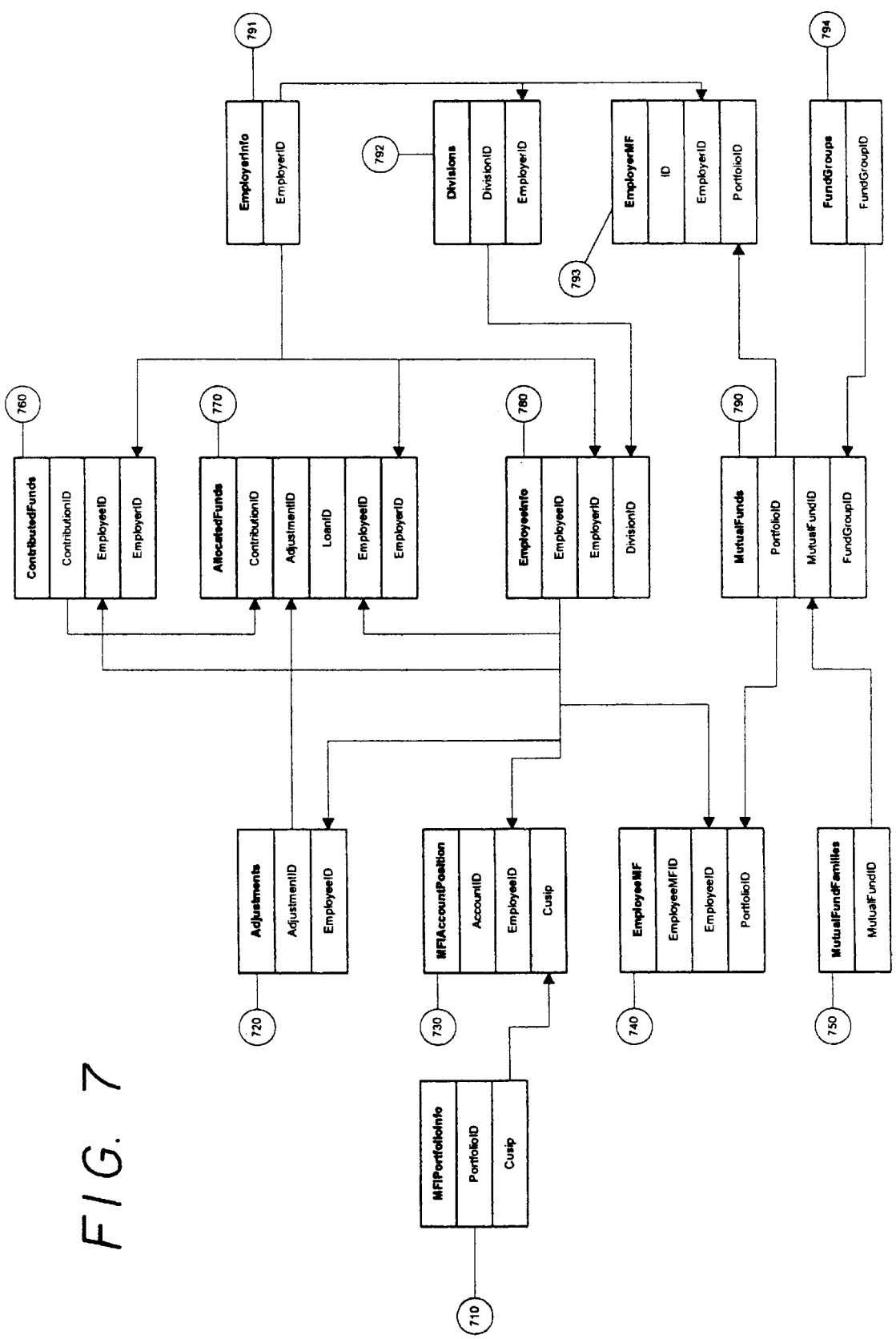
FIG. 7 illustrates a flow diagram of mutual fund investment options.
Figure 8:
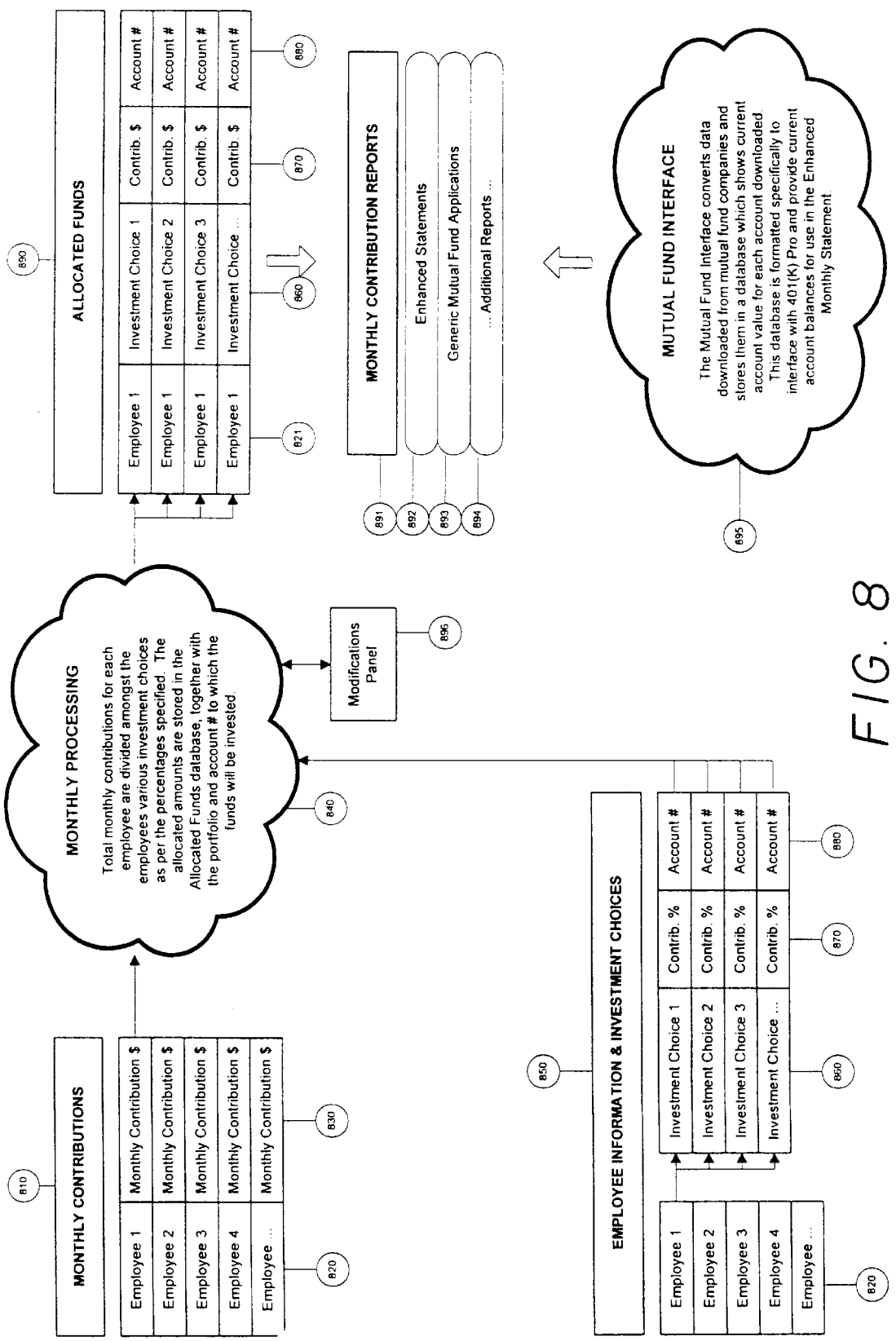
FIG. 8 illustrates a flow diagram of monthly processing.
Figure 9:
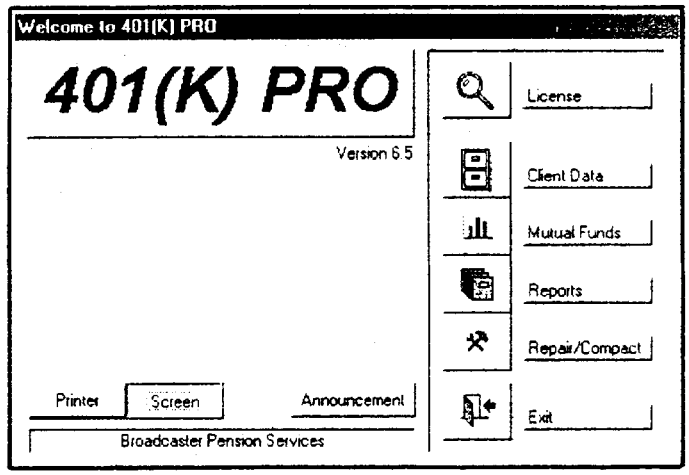
Figure 10:
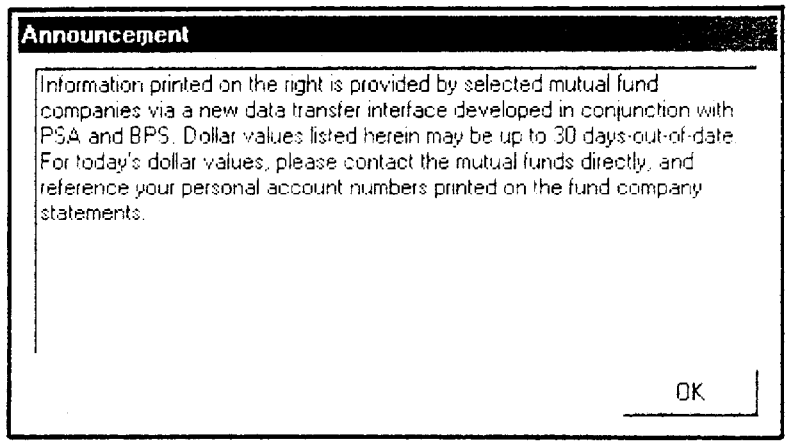
Figure 11:
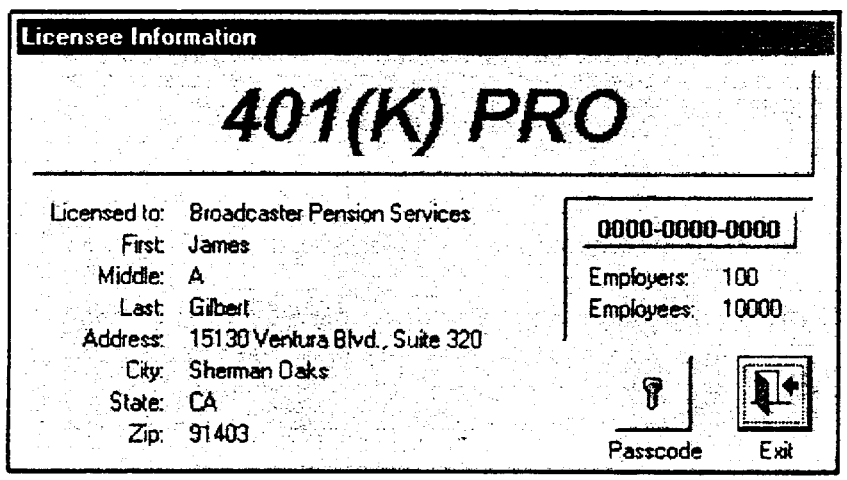
Figure 21:
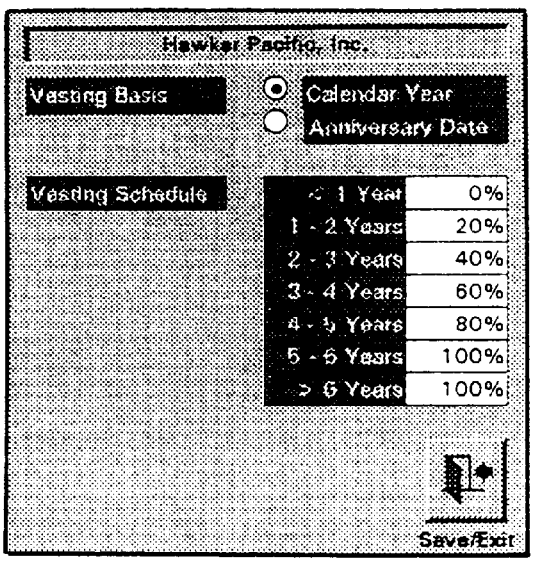
Figure 22:
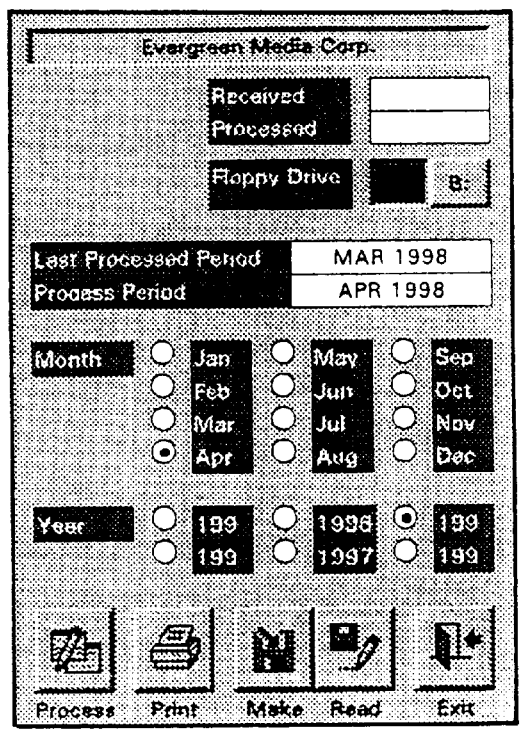
Figure 24:
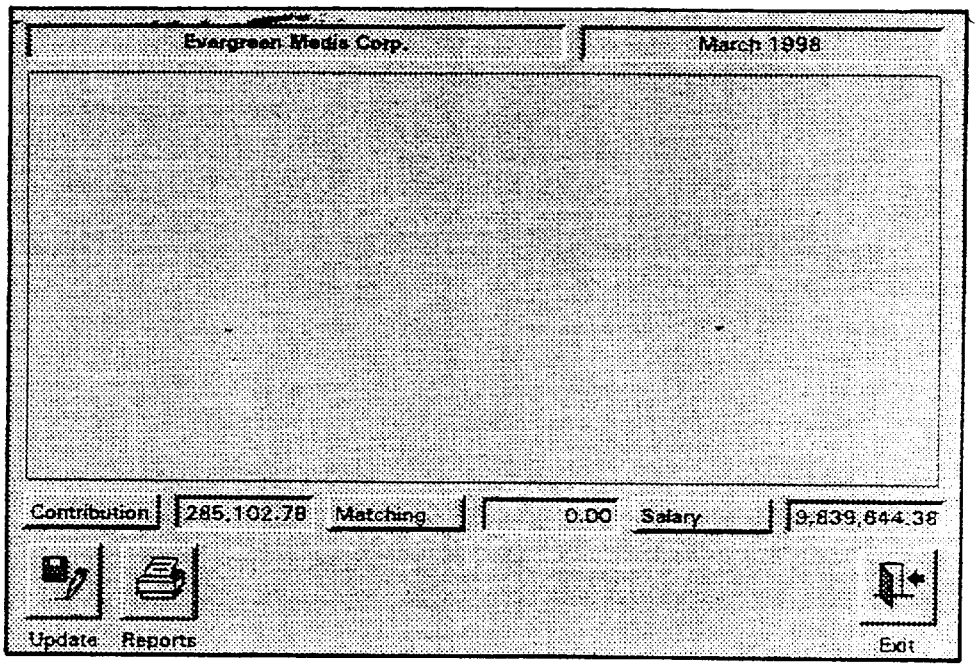
Figure 25:
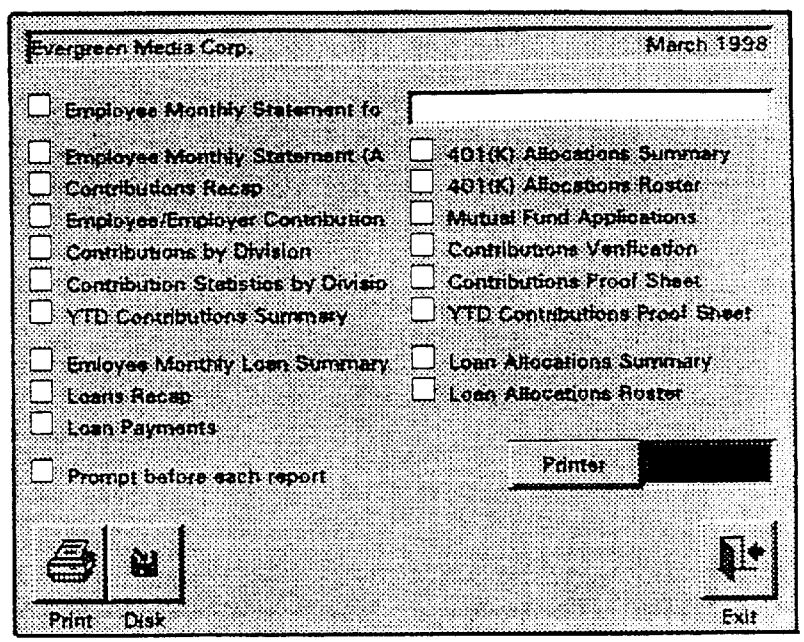
Figure 32:
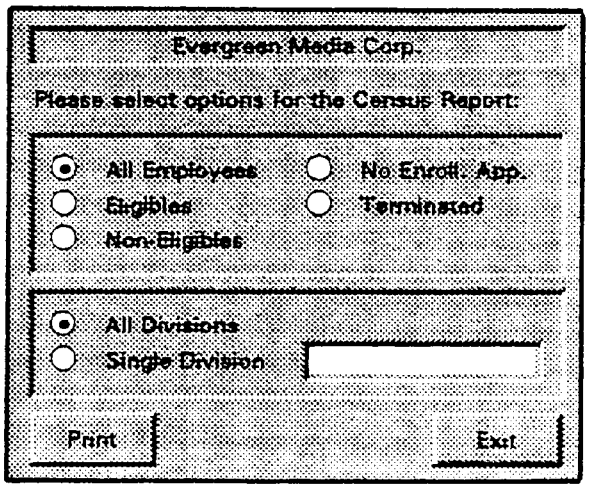
Figure 33:
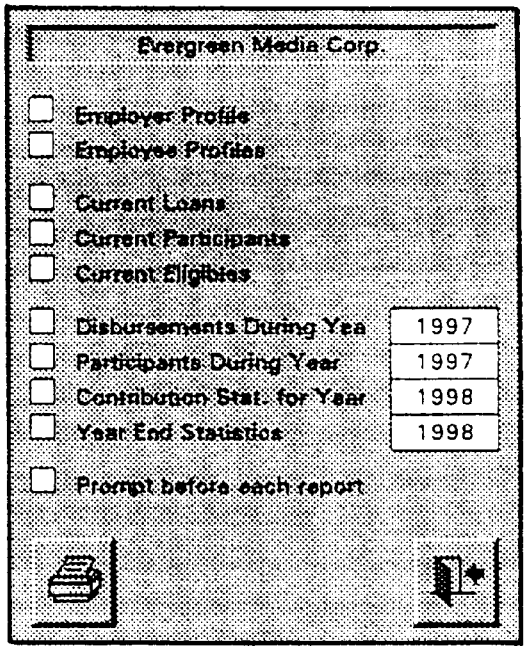
Figure 53:
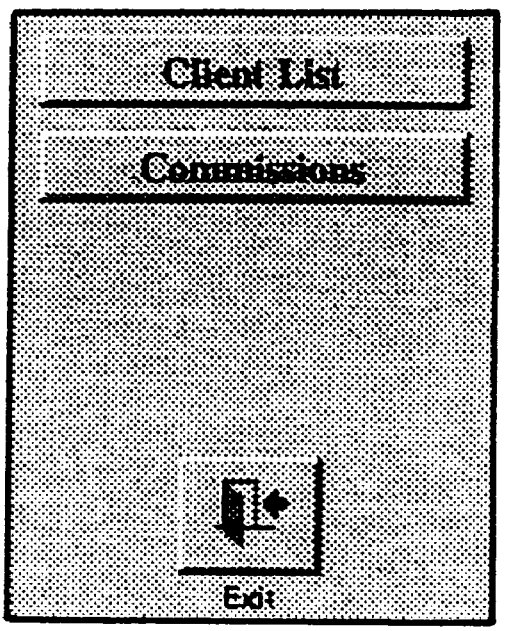
Figure 54:
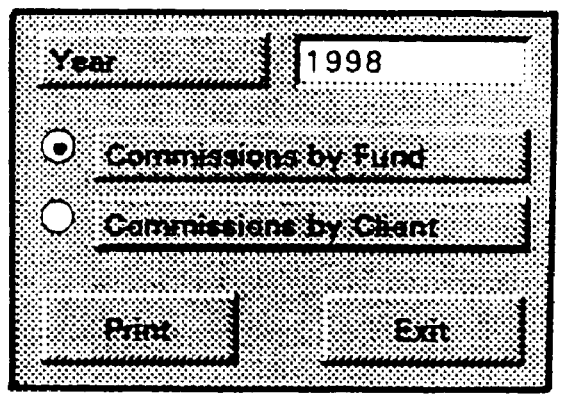
Figure 56:
Figure 57:

A system and method has been shown in the above embodiments for the effective implementation of a computer-based 401(k) plan. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by computer platform (in the preferred embodiment, Microsoft Access™), speed of processing, specific coding, etc. The invention could be practiced locally or across networks, including, but not limited to, LANs, WANs, WWW, Internet, cellular, satellite, virtual, etc. Elements of the drawings not specifically detailed in the specification are deemed to be self-explanatory from element labeling or constitute basic computer functions, e.g. 329—save to disk, 355—exit, etc. FIGS. 5 and 6 illustrate basic processes 1–10 used throughout the flow charts and comprise representative functional descriptions within the corresponding blocks 510–643.

We claim:

1. A computer-based retirement plan comprising:
a menu-based data input interface;
a plurality of main menu selections including any of: mutual fund information, management reports or employer information;
said mutual fund information including at least group and portfolio administration;
said management reports including at least one of: client list or commission administration;
said employer information including at least one of: report compilations, employee information, mutual fund choices, vesting schedules or monthly processing;
said employer information further comprising individual account number allocation per employee for each separate mutual fund choice, and
wherein said individual account number allocation enables one or more of: adding individual mutual fund choices separate from other employee choices, producing monthly reports for each individual without direct interaction with other employee accounts; producing direct access to mutual fund balances for an individual employee based only on the individual account number, or adding new mutual fund choices for individual employees without modification of other employee fund choices.

2. A computer-based retirement plan as per claim 1, wherein said retirement plan further comprises automatic rollovers based on the collection of each of said individual account numbers allocated for an individual employee and subsequent conversion thereafter.

3. A computer-based retirement plan as per claim 2, wherein said automatic rollover further allows each employee to maintain investment choices and existing investment strategy despite separation from the existing retirement plan.

4. A computer-based retirement plan as per claim 3, wherein said maintenance of investment choices despite separation from the existing retirement plan enables transference directly into a new employer plan of the present invention without modification, loss or conversion of said existing investment choices.

5. A computer-based retirement plan as per claim 1, wherein said plan may be implemented locally or remotely on one or more computer-based systems, across networks or existing communication mediums.

6. A computer-based retirement plan as per claim 5, wherein said across networks element comprises any of LANs, WANs, cellular, Internet or Web based networks.

7. A computer-based retirement plan as per claim 1, wherein said retirement plan comprises a 401(k) plan.

8. A computer-based retirement plan as per claim 1, wherein said employees can verify their current account balances by contacting mutual fund companies directly and requesting the required information using said individual account numbers.

9. A computer-based system implementing a retirement plan wherein an employer can change from in-house investment selection-administration pairings chosen at the plan's outset without affecting existing accounts comprising:
a menu-based data input interface;
a plurality of main menu selections including any of: mutual fund information, management reports or employer information;
said employer information comprising at least individual account number allocation per employee for each separate mutual fund choice, and
wherein said individual account number allocation enables adding individual mutual fund choices separate from other employee choices thereby eliminating a required modification of existing plan mutual fund choices.

10. A computer-based system implementing a retirement plan as per claim 9, wherein said retirement plan further comprises automatic rollovers based on the collection of each of said individual account numbers allocated for an individual employee and subsequent conversion thereafter.

11. A computer-based system implementing a retirement plan as per claim 10, wherein said automatic rollover further allows each employee to maintain investment choices and existing investment strategy despite separation from the existing retirement plan.

12. A computer-based system implementing a retirement plan as per claim 11, wherein said maintenance of investment choices despite separation from the existing retirement plan enables transference directly into a new employer plan of the present invention without modification, loss or conversion of said existing investment choices.

13. A computer-based system implementing a retirement plan as per claim 9, wherein said across networks element comprises any of LANs, WANs, cellular, Internet or Web based networks.

14. A computer media product implementing a retirement plan as per claim 13, wherein said maintenance of investment choices despite separation from the existing retirement plan enables transference directly into a new employer plan of the present invention without modification, loss or conversion of said existing investment choices.

15. A computer media product implementing a retirement plan as per claim 14, wherein said employees can verify their current account balances by contacting mutual fund companies directly and requesting the required information using said individual account numbers.

16. A computer-based system implementing a retirement plan as per claim 9, wherein said retirement plan comprises a 401(k) plan.

17. A computer-based system implementing a retirement plan as per claim 9, wherein said employees can verify their current account balances by contacting mutual fund companies directly and requesting the required information using said individual account numbers.

18. A computer-based system implementing a retirement plan as per claim 9, wherein said plan may be implemented locally or remotely on one or more computer-based systems, across networks or existing communication mediums.

19. A computer media product implementing a retirement plan with: access to multiple SEC-regulated investment options, without restrictions on: the number of mutual fund families, investments that a company can choose for its plan, or addition of new funds to an existing in-house investment selection-administration pairings chosen at the plan's outset without modifying existing accounts, comprising computer programmable code implementing:

a menu-based data input interface;

main menu selections including a plurality of retirement plan administrative selections;

allocation and tracking of individual account numbers per employee for each separate mutual fund choice, and wherein said allocation and tracking of individual account numbers per employee for each separate mutual fund choice enables:

addition of individual mutual fund choices separate from other employee choices;

production of monthly reports for each individual without direct interaction with other employee accounts;

production of direct access to mutual fund balances for an individual employee based only on the individual account number, and addition of new mutual fund choices for individual employees outside of existing choices without modification of other employee fund choices or existing plan structure, thereby creating unlimited investment options and tracking thereof, without modification of remaining member accounts.

20. A computer media product implementing a retirement plan as per claim 19, wherein said retirement plan further comprises automatic rollovers based on the collection of each of said individual account numbers allocated for an individual employee and subsequent conversion thereafter.

21. A computer media product implementing a retirement plan as per claim 20, wherein said automatic rollover further allows each employee to maintain investment choices and existing investment strategy despite separation from the existing retirement plan.

22. A computer-based retirement plan as per claim 19, wherein said plan may be implemented locally or remotely on one or more computer-based systems, across networks or existing communication mediums.

23. A computer-based retirement plan as per claim 22, wherein said across networks element comprises any of LANs, WANs, cellular, Internet or Web based networks.

24. A computer media product implementing a retirement plan as per claim 19, wherein said retirement plan comprises a 401(k) plan.

25. A computer-based retirement plan including: a plurality of employee accounts, mutual fund selections and employee choices thereof, employer information and monthly reporting comprising:

a menu-based data input interface;

employer information comprising individual account number allocation per employee for each separate mutual fund choice, and wherein said individual account number allocation enables one or more of: adding individual mutual fund choices separate from other employee choices, producing monthly reports for each individual without direct interaction with other employee accounts;

producing direct access to mutual fund balances for an individual employee based only on the individual account number, or adding new mutual fund choices for individual employees without modification of other employee fund choices.

26. A computer-based retirement plan as per claim 25, wherein said plan may be implemented locally or remotely on one or more computer-based systems, across networks or existing communication mediums.

27. A computer-based retirement plan as per claim 26, wherein said across networks element comprises any of LANs, WANs, cellular, Internet or Web based networks.

28. A computer-based retirement plan as per claim 25, wherein said retirement plan comprises a 401(k) plan.

29. A computer-based retirement plan as per claim 25, wherein encryption is embedded within said employer information.

30. A computer-based retirement plan as per claim 25, wherein an electronic summary of employee accounts and modifications is automatically generated.

31. A computer-based retirement plan as per claim 25, further comprising ADP testing including a what-if pre-processing grid.

* * * * *

UNITED STATES PATENT AND TRADEMARK OFFICE
CERTIFICATE OF CORRECTION

PATENT NO.  : 6,041,313
DATED       : March 21, 2000
INVENTOR(S) : Gilbert et al.

It is certified that error appears in the above-identified patent and that said Letters Patent is hereby corrected as shown below:

Column 1,
Line 57, delete "commissionearning" and insert -- commission earning --.

Column 3,
Line 10, delete "Life" and insert -- life --.

Column 4,
Line 66, delete "Plan" and insert -- plan --.

Column 5,
Line 60, after "processing," and insert -- and --.

Column 6,
Line 57, after "rollovers," insert --and --.

Column 10,
Line 65, after "the" delete "is".

Column 11,
Line 31, after "stated" delete "in #1".

Column 12,
Line 4, delete "User" and insert -- user --.
Line 12, delete "User" and insert -- user --.

Column 13,
Line 3, after "or" delete "p".
Line 4, delete "Employers" and insert -- employers --.
Line 29, after "is" delete "5".

Column 14,
Line 12, delete "Panel" and insert -- panel --.

Column 15,
Line 5, delete "User" and insert -- user --.
Line 33, delete "Report" and insert -- report --.
Line 65, delete "Report" and insert -- report --.

UNITED STATES PATENT AND TRADEMARK OFFICE
CERTIFICATE OF CORRECTION

PATENT NO. : 6,041,313
DATED : March 21, 2000
INVENTOR(S) : Gilbert et al.

It is certified that error appears in the above-identified patent and that said Letters Patent is hereby corrected as shown below:

Column 16,
Line 32, delete "Report" and insert -- report --.
Line 35, delete "Program" and insert -- program --.
Line 54, delete "Form" and insert -- form --.
Line 54, delete "Dealer" and insert -- dealer --.

Column 17,
Line 6, delete "accounted-for" and insert -- accounted for --.

Column 18,
Line 31, delete "and_Client" and insert -- and Client --.
Line 35, delete "commission" and insert -- commissions --.

Claims,
Column 21,
Line 13, delete "9" and insert -- 18 --.

Signed and Sealed this

Twenty-first Day of August, 2001

*Attest:*

*Attesting Officer*

NICHOLAS P. GODICI
*Acting Director of the United States Patent and Trademark Office*